(12) United States Patent
Turulin et al.

(10) Patent No.: US 11,618,180 B2
(45) Date of Patent: Apr. 4, 2023

(54) SYSTEM FOR MANUFACTURE OF ROOF TRUSSES OR EQUIVALENT STRUCTURES

(71) Applicant: MT-Suunnittelu Oy, Kemi (FI)

(72) Inventors: Matti Turulin, Kemi (FI); Elina Turulin, Maksniemi (FI)

(73) Assignee: MT-Suunnittelu Oy, Kemi (FI)

( * ) Notice: Subject to any disclaimer, the term of this patent is extended or adjusted under 35 U.S.C. 154(b) by 0 days.

(21) Appl. No.: 17/293,148

(22) PCT Filed: Nov. 13, 2019

(86) PCT No.: PCT/FI2019/000019
§ 371 (c)(1),
(2) Date: May 12, 2021

(87) PCT Pub. No.: WO2020/099712
PCT Pub. Date: May 22, 2020

(65) Prior Publication Data
US 2022/0009122 A1    Jan. 13, 2022

(30) Foreign Application Priority Data
Nov. 13, 2018    (FI) ...................................... 20187165

(51) Int. Cl.
| B27F 7/15 | (2006.01) |
| E04C 3/17 | (2006.01) |
| B25J 9/00 | (2006.01) |

(52) U.S. Cl.
CPC ................ B27F 7/155 (2013.01); E04C 3/17 (2013.01); B25J 9/0093 (2013.01)

(58) Field of Classification Search
CPC ... B27M 1/08; B27F 7/155; E04C 3/17; B25J 9/0093
See application file for complete search history.

(56) References Cited

U.S. PATENT DOCUMENTS 6,170,163 B1 *  1/2001  Bordignon .............. B27F 7/155
                                                269/910
6,318,251 B1 * 11/2001  Schulz .................... B27F 7/155
                                                100/48

(Continued)

FOREIGN PATENT DOCUMENTS

| WO | 2006111606 A1 | 10/2006 |
| WO | 2006136653 A1 | 12/2006 |

OTHER PUBLICATIONS

International Search Report, Application No. PCT/FI2019/000019, dated Jan. 24, 2020, 3 pages.

*Primary Examiner* — Lee A Holly
(74) *Attorney, Agent, or Firm* — Ziegler IP Law Group, LLC

(57) ABSTRACT

A system for manufacturing roof trusses is assembled one joint at a time on an assembly line, which includes a receiving table, an assembly station and an output table. The assembly station includes one or more presses, robot grippers, and arrangements connected to the presses for feeding nail plates and loading them to the presses. Each joint being accomplished so that the members to be joined in addition to the members already present there have been moved and positioned on the receiving table and onwards to the assembly station. Robot grippers hold the members to be joined and align them in place against each other. A press loaded with the nail plates designated to this joint is aligned with the steering in the position of the joint and presses the nail plates in place to complete the joint. The structure is guided to move to the output table.

10 Claims, 13 Drawing Sheets

(56) References Cited

U.S. PATENT DOCUMENTS

| | | | |
|---|---|---|---|
| 2008/0172983 A1* | 7/2008 | Urmson | B27M 1/08 52/745.19 |
| 2010/0024354 A1 | 2/2010 | McAdoo et al. | |
| 2010/0061829 A1* | 3/2010 | McAdoo | E04C 3/17 901/14 |
| 2013/0042480 A1* | 2/2013 | Turulin | E04C 3/17 227/19 |
| 2016/0123011 A1* | 5/2016 | Joseph | B27F 7/155 269/45 |

* cited by examiner

SYSTEM FOR MANUFACTURE OF ROOF TRUSSES OR EQUIVALENT STRUCTURES

FIELD

The aspects of the disclosed embodiments are related to manufacture of roof trusses or similar structures. More particularly, the aspects of the disclosed embodiments are related to a system for manufacture of roof trusses or similar structures from wooden members which are dimensioned and formed to be set against one another at joints and then connected to each other by means of nail plates or equivalent connection means.

BACKGROUND

FIG. 1 presents an example of a roof truss to be manufactured with the system according to the aspects of the disclosed embodiments. The wooden members M1-M13 of the truss, the junctions J1-J11, and the nail plates N1-N6 as well as their size and alignment at the junctions are designed according to certain standards. The nail plates are pressed into the wooden members at the junctions from both sides.

In the manufacture of roof trusses and the like controlled mechanics and robotics are nowadays often used, for example, for moving and positioning truss members on a table and aligning them with one another. For alignment, the assembly table is provided with, for example, guided movable stops such as plates, pins, pucks or rollers. A common solution is preliminary fixation of the aligned members to each other with staples, rivets or the like e.g. by means of a stapler or staple gun moved and targeted by a robot. The next step is to press the nail plates into place at the joints, and often the quality of the joints is further assured, for example, by a strong roller press through which the truss or similar structure is fed.

When assembling the structure from the wooden members, it should be noted that there is always distortions, like twist, spring and bow, and dimensional errors to some extent. And when the members are first fixed together by means of staples or similar relatively weak connecting means, and then the assembled structure is moved and further processed at the finishing stages, the risk of some joint failures and structural distortions is considerable and must be taken into account in the arrangements of production.

One solution of the type described above is presented in US 2008172983 A1. There roller type stop means moving on the table are used to guide the truss members and the structure assembled with preliminary fixations to the desired position and orientation. Preliminary fixation may be made, for example, by a robot equipped with a staple gun, and taping or other adhesive material is also suggested as a possible solution. The structure thus assembled is then guided to a transverse portal extending across the table, two automated presses operating at the portal and being loaded with nail plates at the ends of the portal. The presses press nail plates into the joints provided with preliminary fixations. The system further comprises a more robust press extending over the width of the table for pressing larger nail plates on the junctions.

In the solution of US 2010061829 A1, it is essential that one or more nail plates are pressed into place on the truss members according to the design data before transporting to the assembly table. The assembly robot is transporting and positioning members on the table one after another, whereby lightly attached joints are formed on the nail plates. The joints are reinforced by feeding the structure through a roller press as the assembly progresses, and finally the assembly is completed by feeding the truss through an even more powerful press. As the joints are strengthened while the assembly progresses, the risk of joint failures and distortions is reduced. Several stages of work are still necessary in the assembly process for making and finishing the joints.

In the solution of WO 2006111606 A1, the nail plates for the underside of the joints are first placed and locked in place on the assembly table. In the next step, the robot grippers are positioning each wooden member precisely over the nail plates and then press to fasten it on the nail plates. In the third stage, the robots transport and press nail plates to the upper side of the joints. When the roof trusses usually include also long wooden members with several joint positions, due to the above-mentioned properties of the wooden members, a robotic gripper is needed for each joint for positioning and pressing the wooden member precisely in place. The solution thus requires a large assembly table and precise control, alignment and robot technology throughout its size. Once the nail plates have been pressed into place by a combination tool which operates as both a robotic gripper and a press, a fourth step in the process is necessary in which the joints are finished with more powerful pressing means.

SUMMARY

The aspects of the disclosed embodiments are directed to provide a system for manufacturing roof trusses or similar structures, by which the disadvantages and risks of the known solutions are largely avoided, while at the same time intensifying and streamlining the manufacturing process.

To accomplish this, the system of the disclosed embodiments for manufacturing roof trusses or similar structures comprising wood members dimensioned to fit against each other in joints and nail plates to be pressed into the joints for connecting the members there to each other, the system comprising a control arrangement for programming and steering the assembly process in accordance with design data and manufacturing plan and transfer and placing arrangements for controlled introduction and placing of the wooden members to an assembly line, is characterised in that which is defined in the characterising part of the independent claim 1 of the appended claims. Other claims define various embodiments of the present disclosure.

In the solution according to the aspects of the disclosed embodiments there is no need to build a jig covering the entire truss, nor to assemble the truss wholly or in part with preliminary fixations by staples or the like, so that it can be moved and processed in subsequent work steps.

The manufacturing arrangement is not even otherwise bound to a particular truss structure, but can be switched from one structure to another by changing the system control. In principle, it is possible to produce various trusses in succession. This also results in easier optimisation of the use of timber.

A significant advantage is that the truss assembly has only one work stage to be controlled, in which the grippers take in the parts to be joined, align them, and hold them firmly in the correct position where the press is guided to for pressing the aligned nail plates in place. By ensuring the accuracy and quality of manufacture in this way for each joint, it is at the same time assured for the entire truss and for all trusses to be manufactured.

The wooden members are made by sawing timber, for which there is typically a tolerance of a few millimeters in thickness and width, and some degree of dimensional errors remains in the members after sawing. When the assembly in the solution according to the disclosed embodiments focuses on one joint at a time, also dimensional errors may be taken into account in the best possible way in programming, control and execution of the assembly and minimize their effects on the quality of the fabricated structure.

The realisation of the member alignment automation is facilitated by the fact that the actual implementation of the assembly operates in a small area. When a truss or equivalent structure is in the assembly passed only through this one assembly point or station, the length of the assembly line can also be minimised.

Robot grippers can be implemented using relatively simple robot technology, and all grippers can be substantially similar. When there is a small number of different equipment in one place, both operation, management and maintenance of them may be simplified and are economically advantageous.

BRIEF DESCRIPTION OF THE DRAWINGS

The aspects of the disclosed embodiments are described in more detail below with reference to the accompanying drawings, in which.

DETAILED DESCRIPTION

Figure 1:
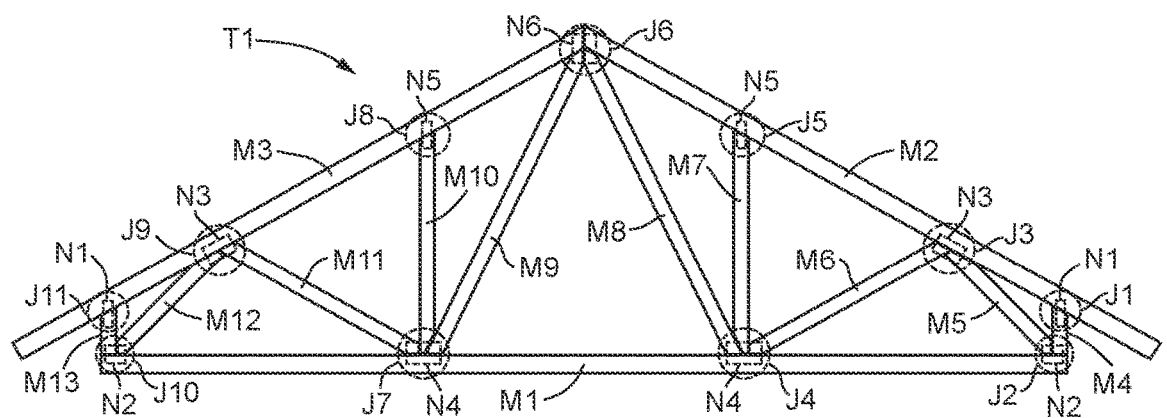
FIG. 1 illustrates an example of roof trusses or similar structures.

FIG. 1 shows an example of a conventional roof truss T1 formed by long bottom and top cords M1, M2 and M3 and web members M4 to M13. The members are dimensioned and shaped to be set against each other at joints J1 to J11, where they are connected to each other by pressing on both sides of the structure nail plates N1 to N6 selected according to the dimensions and configuration of the joint.

FIGS. 2 to 8 schematically illustrate the manufacture of a truss on an assembly line comprising an receiving table 1, an assembly station RGB, and an output table 2. As noted above, the truss is assembled joint by joint to be completely finished. Truss members are brought beside the receiving table 1 according to the assembly order so that the members needed for subsequent joint are every time available. There may be one or more infeed lines. Lines 10A and 10B, for example, are suitable controllable belt conveyors. The long members are brought in line 10A and the short members in line 10B. Suitable one or more robots shift the members needed for the next joint to the table 1 close enough to their positions in the joint to be finished. The figures schematically show the articulated robot 11 operating on the portal 9 moving on the rails 8 beside the edges of the table. When implementing the solution in practice, an quickly enough operating industrial robot arrangement may be suitable for this task.

Figure 2:
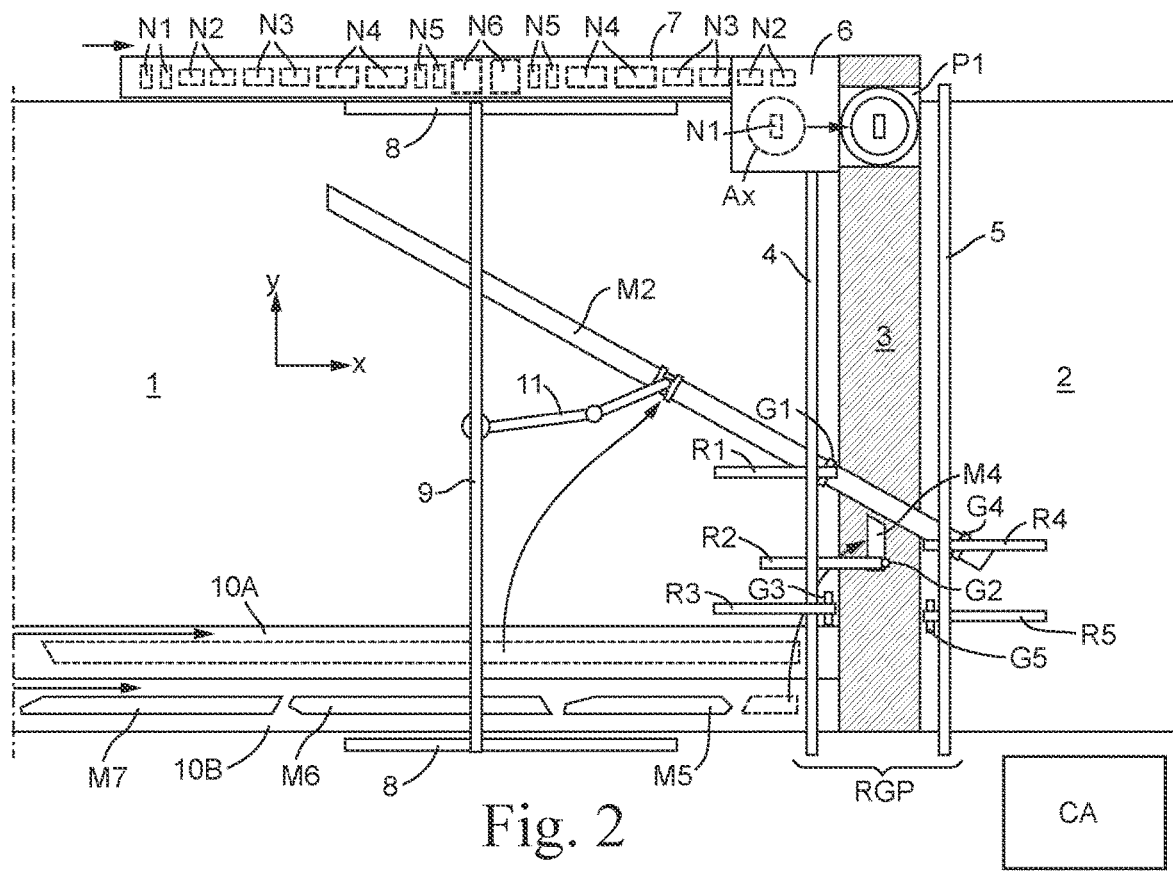
FIGS. 2 to 8 schematically illustrate the manufacture of the roof truss of FIG. 1 with a system according to the disclosed embodiments.

In FIG. 2, the robot 11 has moved from the infeed lines to the receiving table the member M4 and the top chord M2, at the joint J1 of which the first connection will be made. The joints are made at the assembly station RGP, which comprises the press area 3 transverse to the line x, the press P1 and the robot grippers R1/G1, R2/G2, R3/G3, R4/G4 and R5/G5 operating on the bars 4 and 5 extending across the assembly line. The robot grippers are described as highly simplified comprising an arm Rn and a grabber Gm moving, rotating and grasping on the arm. In FIG. 2, the grippers R1/G1 and R4/G4 are holding the part M2 and gripper R2/G2 the part M4. The receiving table 1 is preferably a solid, flat substrate applicable for easy moving and aligning accurately the members to their final positions in the joints. The press area 3 is, for example, a plate conveyor belt operating at the same level with the tables 1 and 2. The output table 2 is advantageously a roller table for moving the resulting structure and finally the manufactured truss conveniently forward.

The operation of the press area 3 and the press P1 essentially comprises the loading arrangement 6 of the nail plates, to which the infeed line 7 brings the nail plates N1 to N6 according to the assembly order. Implementation examples of the press unit and its charging arrangement are explained in more detail below. In FIG. 2, the press P1 has moved close to the loading arrangement for loading the nail plates N1 for the first joint.

The nail plates are loaded by means of transfer plates such that the nail plate is aligned and secured in the loading unit 6 to the transfer plate Ax, which is, for example, adapted to be pushed into the press for shifting the nail plates to the press plates. In these figures, for example, loading of nail plates is illustrated, for simplicity, as a single transfer plate operation. In practice, two nail plates are loaded to the press, one to the upper and another to the lower press plate, and when transfer plates or units are considered hereinafter, the question is about the transfer of both the upper and the lower nail plate.

After the nail plates have been released, the transfer plates move to wait for the loading of the next nail plates or directly to start the loading, depending on how many transfer units are in use. If more than one unit are in use, the next one is already waiting for the nail plates to be moved to the press. FIGS. 3 to 8 illustrate the assembly of the truss up to joint J6, and the loading of nail plates is described as being carried out by means of transfer plates without indicating them with reference numbers or marks.

The nail plate feeding and loading arrangements associated with the press units can be implemented in practice with many different solutions. The nail plates may be loaded, for example, by an arrangement whereby robot hands take them from a storage rack or the like and align and position them to a press plate with a magnetic fixation, for example.

The operation of the infeed lines 10A, 10B and 7, the robot 11, the robot grippers R1/G1 to R5/G5, the press area 3 and the press unit P1, and the nail plate loading arrangement are controlled by the control arrangement CA, which may be realised by means of normal CAM technology. First, the relisation of the arrangement is facilitated by the simple, easily recognisable and location-specific shape of the truss members. In addition, they are processed at substantially the same level all the time. The movements of the members and their timing can be programmed to be executed with a certain accuracy according to the truss design data and the manufacturing plan. On the other hand, identification of the members, more precise definitions of the grasping points, and final alignments can be programmed to be performed, for example, on the basis of information provided by suitable and suitably positioned machine vision sensors and laser devices.

Figure 3:
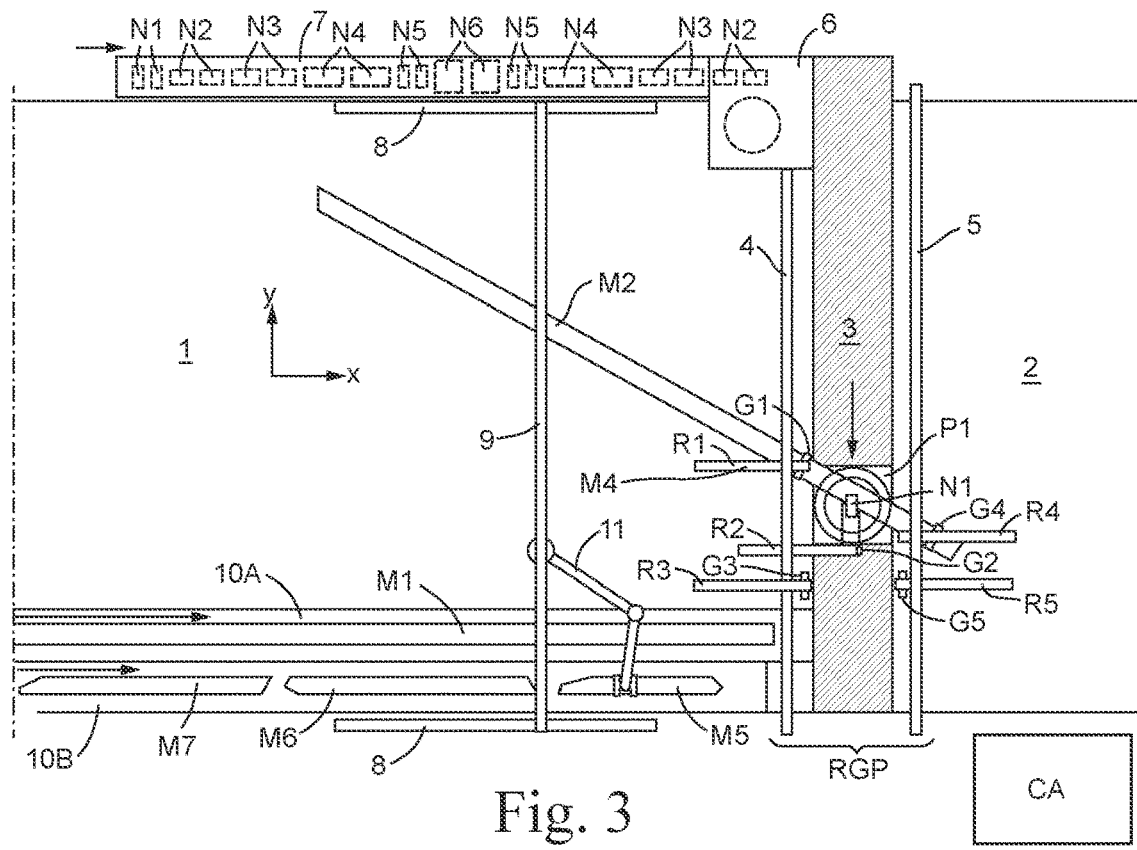

In FIG. 3, the grippers R1/G1 and R4/G4 holding the member M2 and the gripper R2/G2 holding the member M4 on the other hand have now precisely aligned these members and hold them firmly in place for pressing. The press P1 has moved and positioned to press the nail plates N1 in place above and below the structure to complete this joint.

Figure 4:
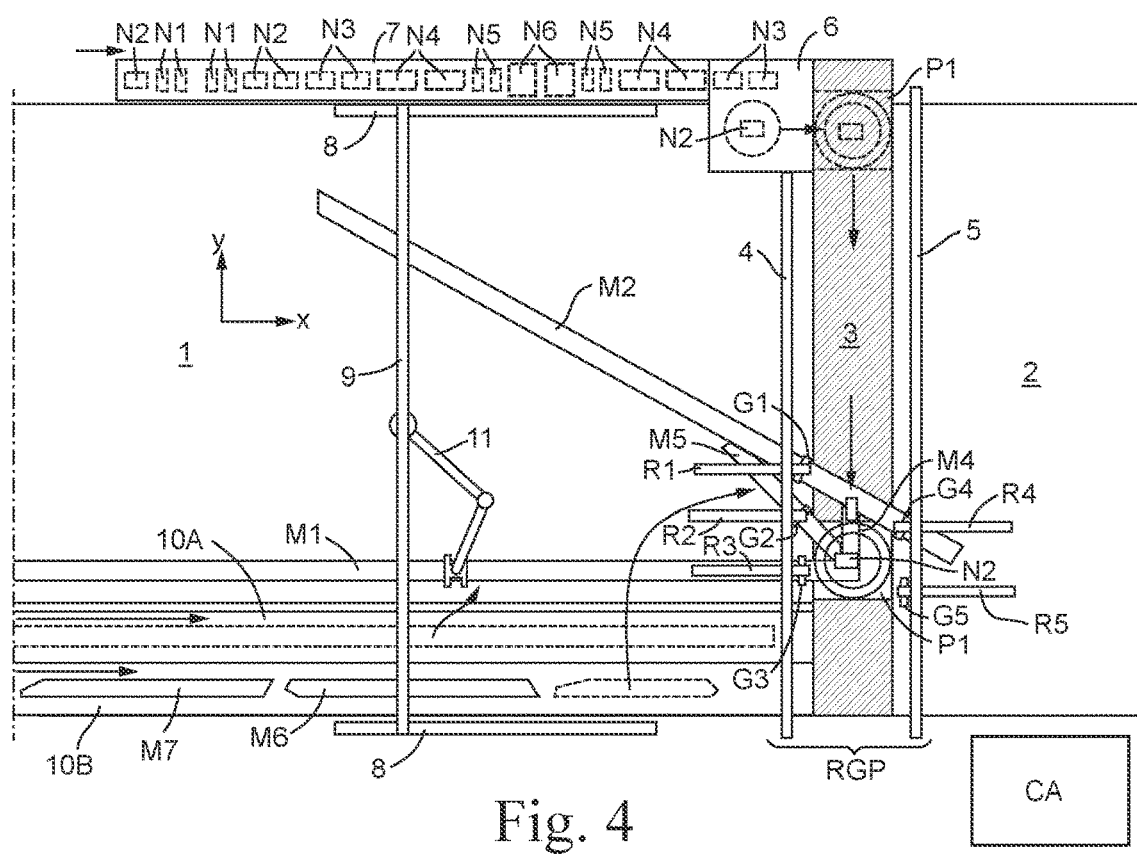

In FIG. 4, the robot 11 has moved the member M5 and the bottom chord M1 from the infeed lines 10A and 10B to the receiving table 1. The grippers R1/G1 and R4/G4 still hold in place the member M2 and at the same time the member M4 already connected thereto. The gripper R3/G3 holds in place the bottom chord M1, which is still supported by the robot 11 with its grabber. The press P1 has visited the loading arrangement 6 for loading of the nail plates N2, as shown by the dashed line drawings, and is now in place for pressing the nail plates to the joint.

Figure 5:
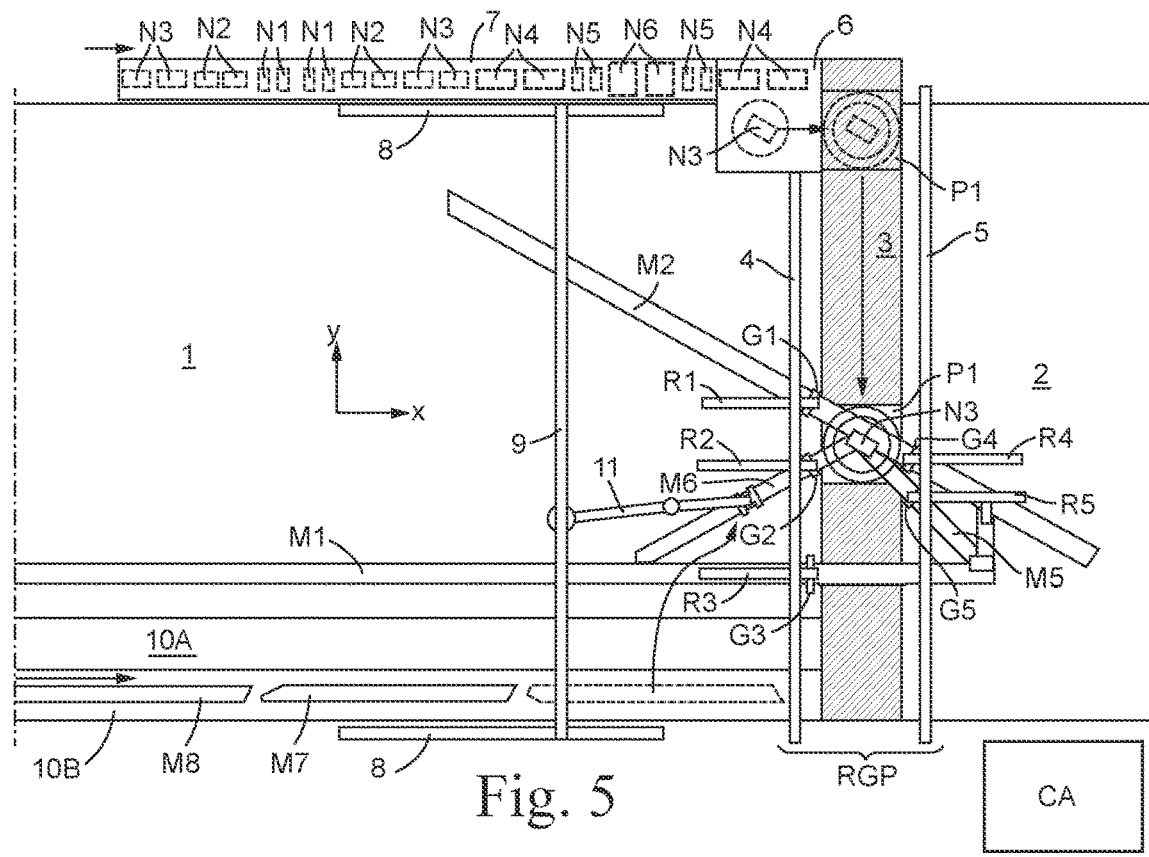

In FIG. 5, the robot 11 has further moved the member M6 from the infeed line 10B to the table 1. The grippers R1/G1 and R4/G4 hold the member M2 in place on both sides of the joint J3 (FIG. 1) to be completed. It is advantageous to hold the wooden member in place on both sides of the joint, since there may be distortions also within a short length. The effect of the distortions is so minimised. The gripper R5/G5 holds the member M5 and the gripper R2/G2 the member M6. The gripper R3/G3 holds the member M1 during this assembly step, but during alignment and pressing, the grip is released. In the solution according to the aspects of the disclosed embodiments, it is essential to focus on making one connection at a time, as well and precisely as possible. Therefore, the members coming from different directions into the joint to be completed at that moment are held in place and in the correct positions, and the grips on the other members are then released. The press P1 has visited the loading arrangement for loading of the nail plates N3, as shown by the dashed line drawings, and is now ready to press the nail plates in place.

Figure 6:
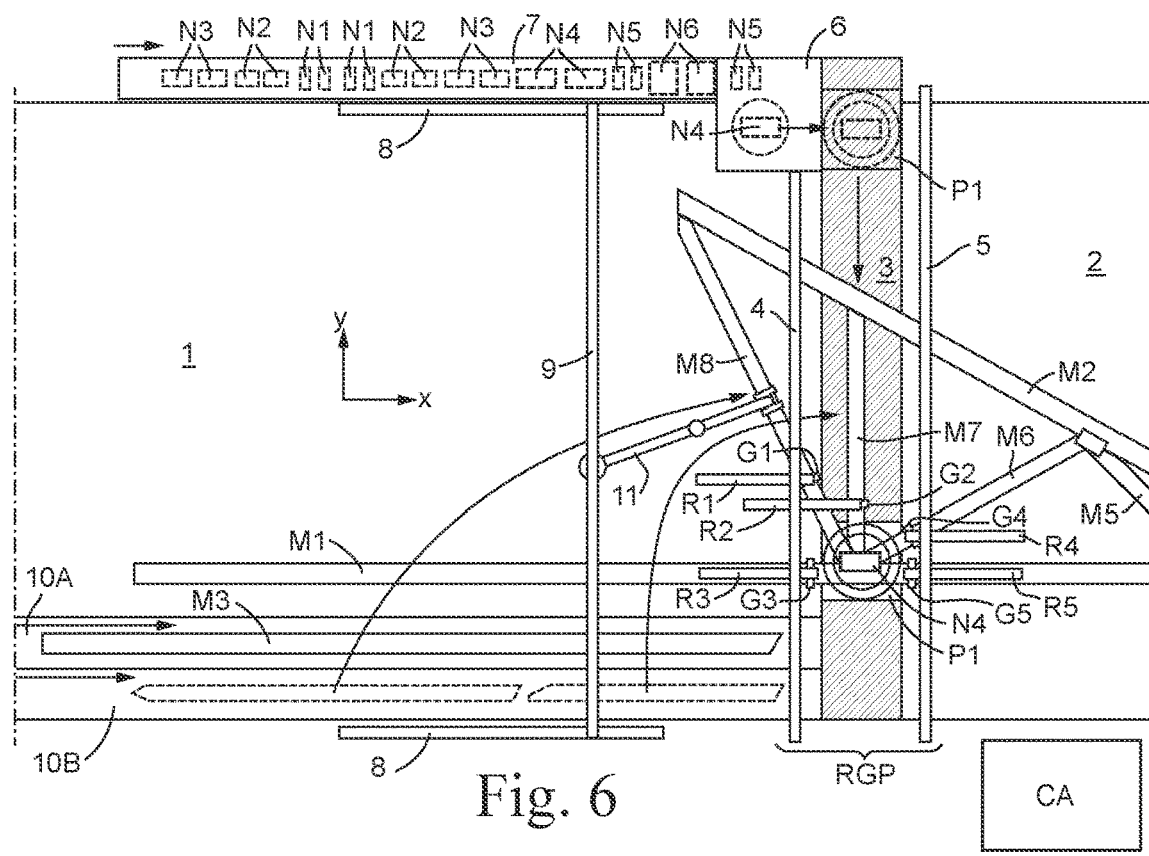

In FIG. 6, the robot 11 has moved the members M7 and M8 from the infeed line 10B to the receiving table 1, and the joint J4 is being made (FIG. 1). The bottom chord M1 is involved in the joint and is held in place by the grippers R3/G3 and R5/G5 on both sides of the joint. The member M6 is also involved in the joint and is held in place by gripper R4/G4. The member M7 is held in place by the gripper R2/G2 and the member M8 by the gripper R1/G1. The press P1 has again made a visit for loading, as shown by the dashed line drawings, and has received the nail plates N4 to be pressed.

Figure 7:
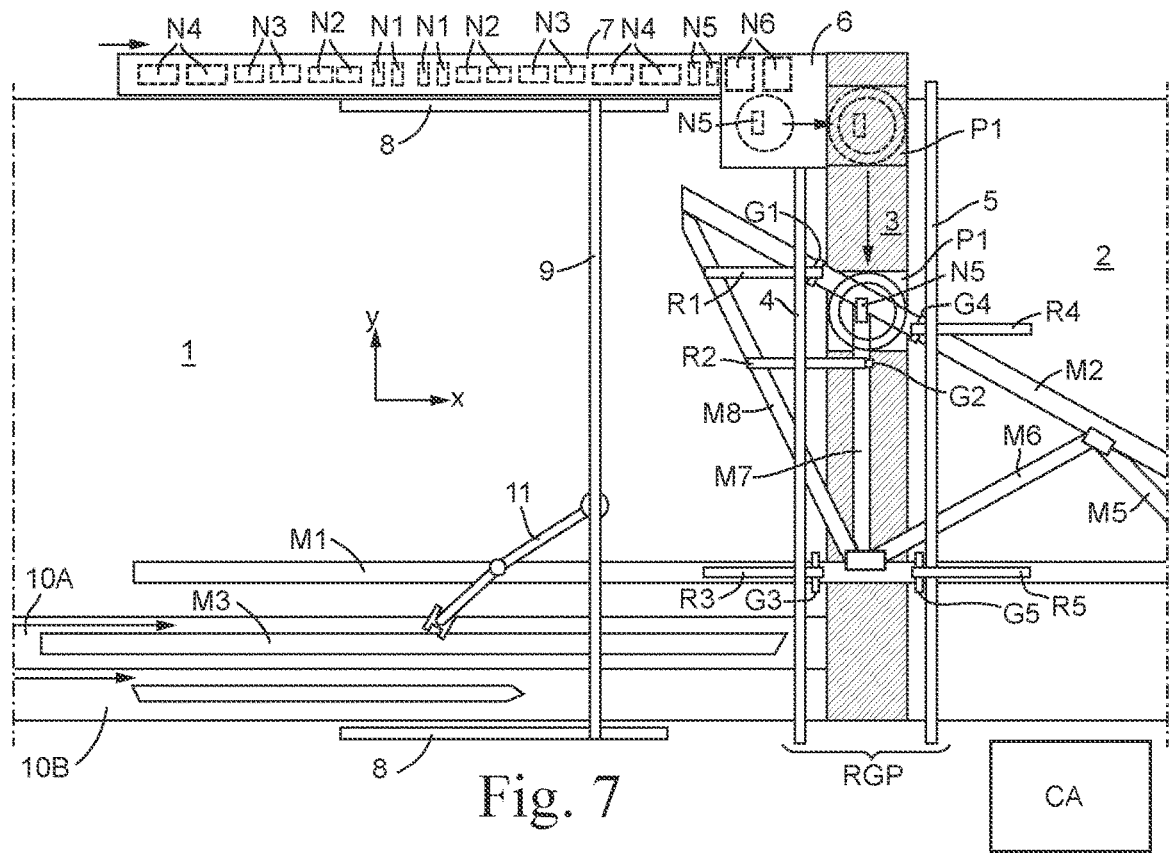

In FIG. 7 the assembly continues with the same members. The member M2 is now held on both sides of the joint by the grippers R1/G1 and R4/G4, and the gripper R2/G2 holds in place the member M7. The grips of the grippers R3/G3 and R5/G5 on the member M1 are released during the connection of the joint. The nail plates N5 loaded in the way shown by the dashed line drawings are pressed in place.

Figure 8:
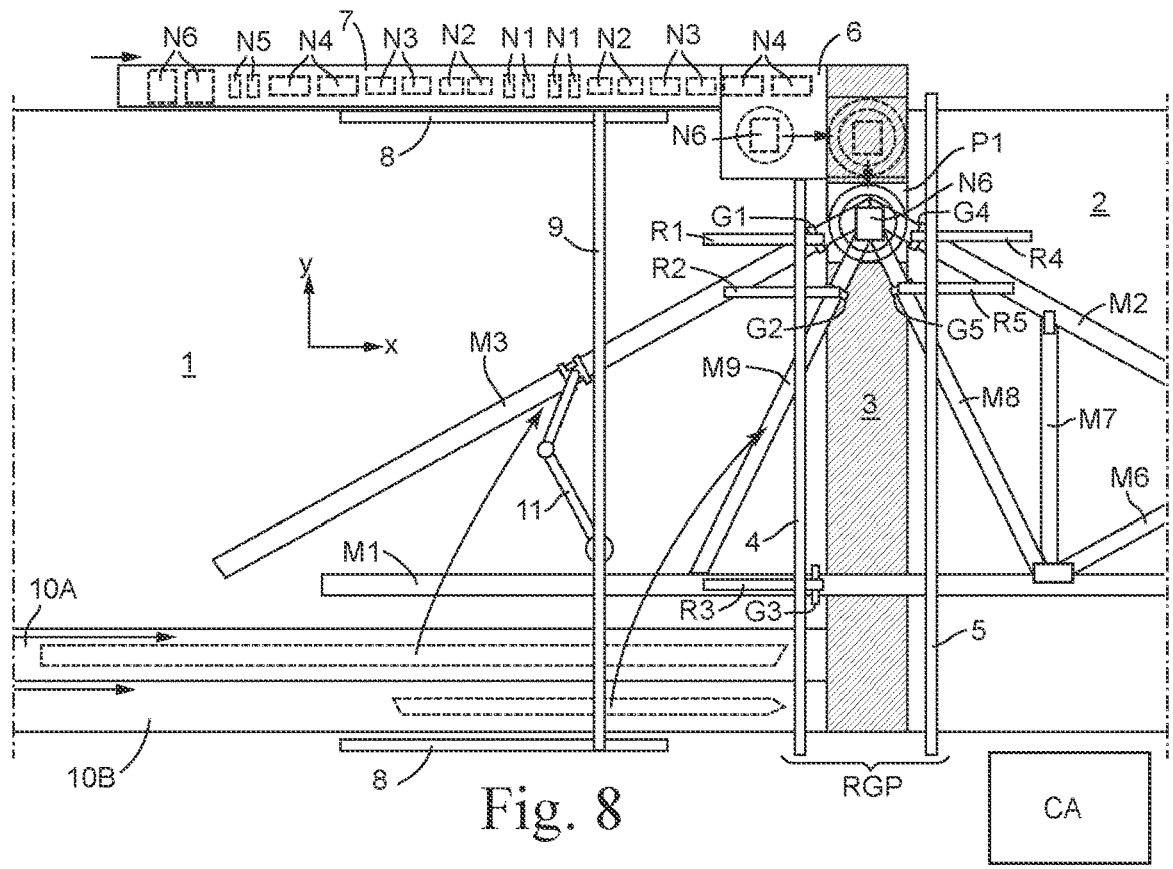

In FIG. 8 the robot 11 has moved in place the member M9 from the infeed line 10B and the top chord M3 from the line 10A. The gripper R1/G1 is holding it and the robot 11 is supporting it to stay in place. The gripper R2/G2 holds the member M9, the gripper R5/G5 the member M8 and the gripper R4/G4 the member M2. The grip of the gripper R3/G3 on the member M1 is again released. Once again, the nail plates N6 have been loaded into the press P1 as shown by the dashed lines, and are now pressed into place.

The truss manufacture continues in the same way to the last joint J11, where it is ready and can be moved from the output table 2 to the warehouse or for delivery to the customer.

Figure 9:
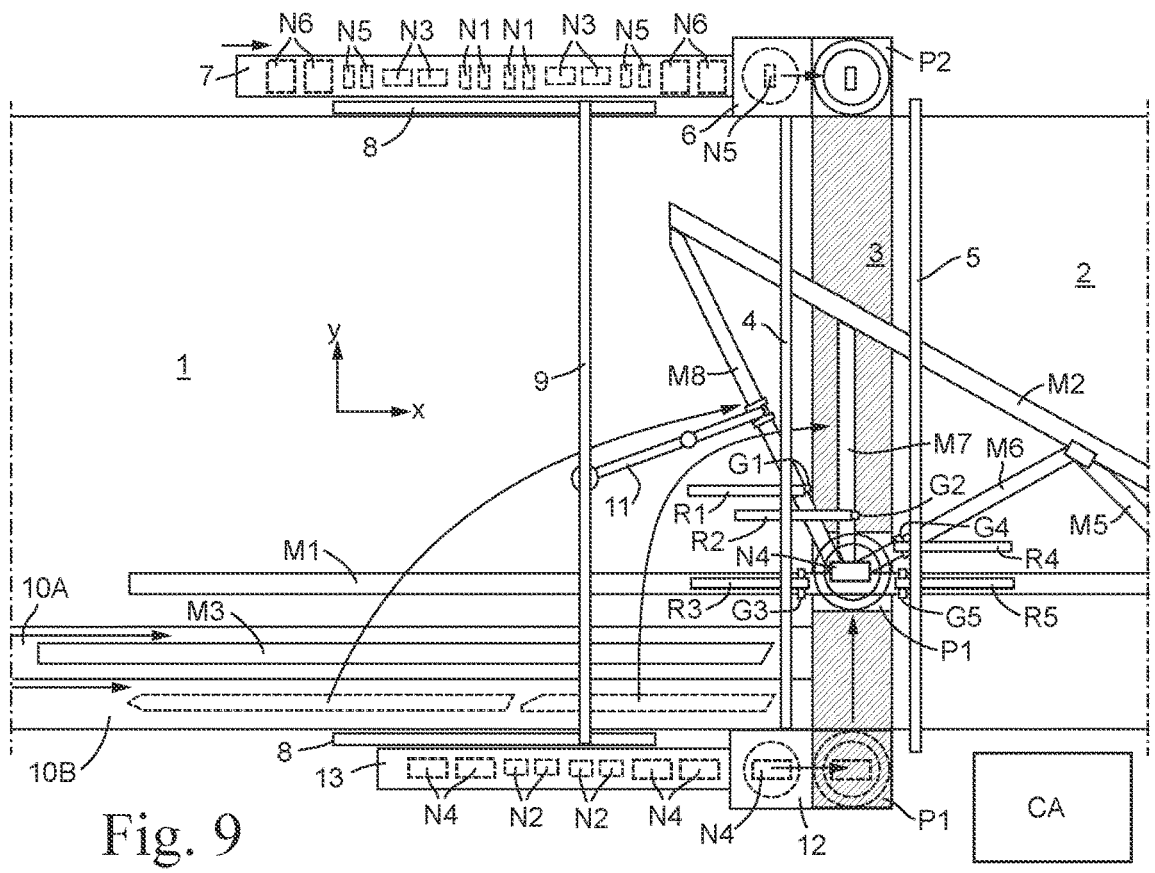
FIGS. 9 and 10 schematically show another example of a system according to the disclosed embodiments.
Figure 10:
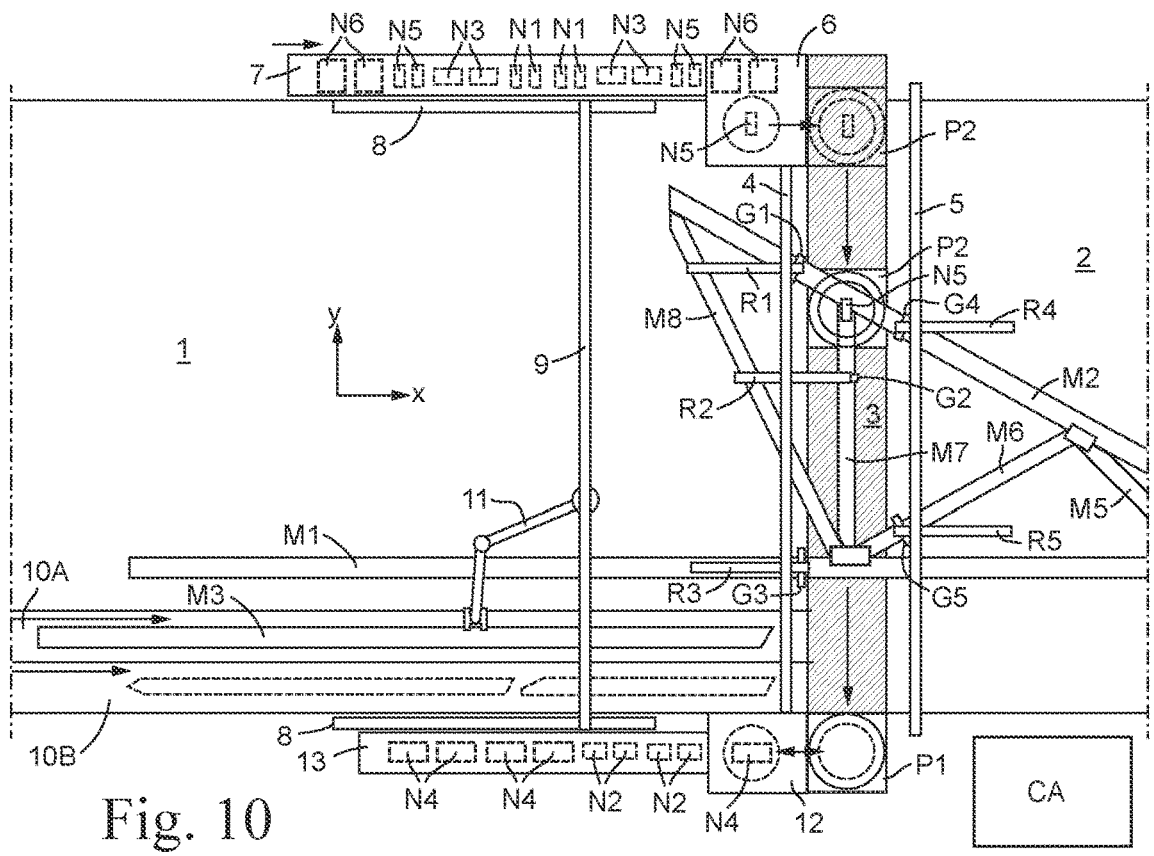

FIGS. 9 and 10 show schematically an example of the system according to the aspects of the disclosed embodiments and its operation in which two presses P1 and P2 are operating in the press area 3. There are also two infeed lines and loading units for the nail plates, the line 7 and the unit 6 on one side of the receiving table 1, and the line 8 and the unit 12 on the other side. The nail plates are divided and arranged between the lines, the loading units and the presses according to the specific assembly plan. FIGS. 9 and 10 show the steps corresponding to the steps of FIGS. 6 and 7, i.e. the assembly of the joints J4 and J5.

In the working step of FIG. 9, the grippers are holding the chords and other members in place in substantially the same way as in FIG. 6. When the bottom chord M1 is involved in the joint, it is held in place by the grippers R3/G3 and R5/G5 on both sides of the joint. The member M6 is held in place by the gripper R4/G4, the member M7 by the gripper R2/G2 and the member M8 by the gripper R1/G1. The nail plates N4 are loaded into the press P1 by means of the transfer plate from the loading unit 12, as shown by the dashed line drawings, after which the press P1 has moved to press them into place. At the same time, the other press P2 is at the loading unit 6 where nail plates N5 are loaded thereon by means of the transfer plates.

In FIG. 10, the grippers R1/G1 and R4/G4 hold the member M2 on both sides of the joint to be pressed, and the gripper R2/G2 holds in place the member M7. The grip of the gripper R3/G3 on the member M1 and likewise the grip of the gripper R5/G5 on the member M6 have been released during the connection of the joint. The press P2 is moved and positioned in place for pressing the nail plates N5 on the joint.

It is obvious that such a solution can significantly speed up and enhance the truss assembly, since one press may be loaded while the other is performing the pressing of the previous joint. The movements of the presses can also be clearly shortened.

FIGS. 11(a) to 11(f) schematically illustrate the same truss assembly period as FIGS. 2 to 7 above. The joints J1 to J5 are completed into which the corresponding nail plates N1 to N5 are pressed. The members and their reference marks are generally the same as those in FIGS. 2 to 7. Here, the press P1 is served by the nail plate loading station L1 on one side of the assembly line 1, 3, 2 and the press P2 by the loading station L2 on the other side. The respective transfer plates or devices A1 and A2 operate between the loading station and the press. In practice, there may be a transfer device which moves, for example, on the bar 5 and which includes transfer plates for shifting the nail plates to both the upper and lower side pressing plates of the press.

FIGS. 11(a) to 11(f) do not illustrate robotics and gripper operation, but only schematically the movements of the presses and the nail plate transfer device. After the nail plate has been pressed, the press moves aside from the truss structure to a suitable position with respect to the next joint. The transfer device has had time to visit the loading station to retrieve the nail plates for the next joint which it now can bring and transfer to the press.

Figure 11A:
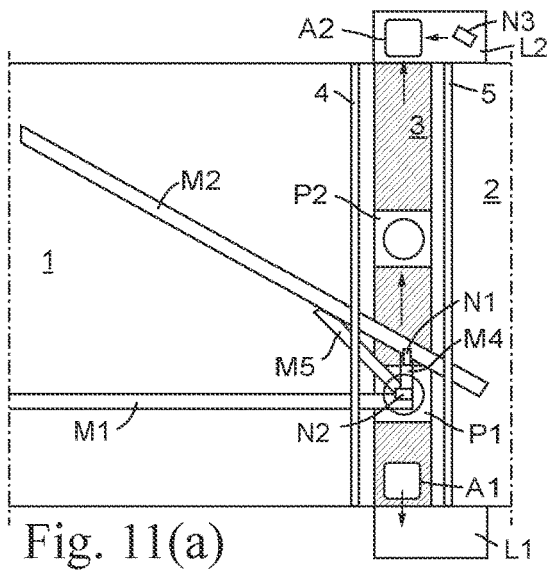
FIGS. 11(a) to 11(f) schematically show one more example of a system according to the aspects of the disclosed embodiments and its operation.

In FIG. 11(a), the press P2 has pressed the nail plates N1 and moved to a suitable position with respect to the next joint. The blank transfer device A2 has moved to the loading station L2 for loading the next nail plates. Elsewhere, the nail plates N2 have been loaded to the press P1 and it has moved to press complete the joint connecting parts M1, M4 and M5. The transfer device A1, which brought the nail plates N2, is moving for a new loading to the loading station L1.

Figure 11B:
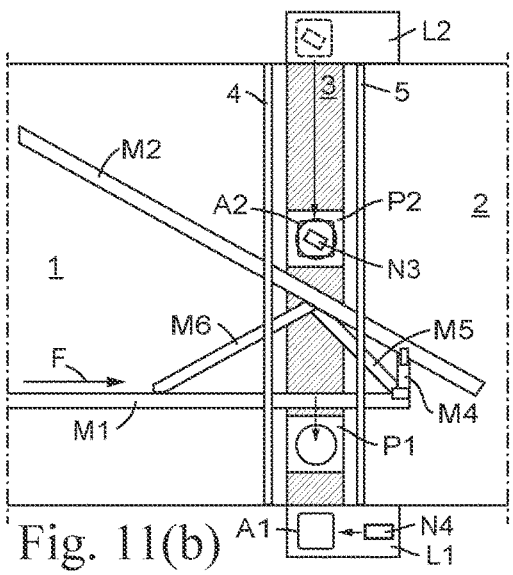

In FIG. 11(b), the structure has been moved forward for completing the next joint. The press P1 has moved aside from the truss structure, and the transfer device A1 is at the loading station L1, where the nail plates N4 are loaded therein for the next joint. Elsewhere, the transfer device A2 has entered beside the press P2 for loading the nail plates N3 from there to the press.

Figure 11C:
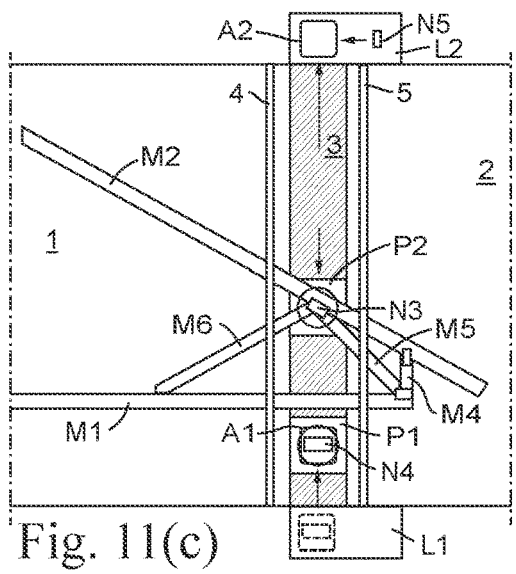

In FIG. 11(c), the press P2 has moved to the joint to perform pressing of the nail plates N3. The transfer device A2 has returned to the loading station L2 to receive the next nail plates N5. Elsewhere, the nail plates N4 provided by the transfer device A1 from the loading station L1 are placed in the press P1.

Figure 11D:
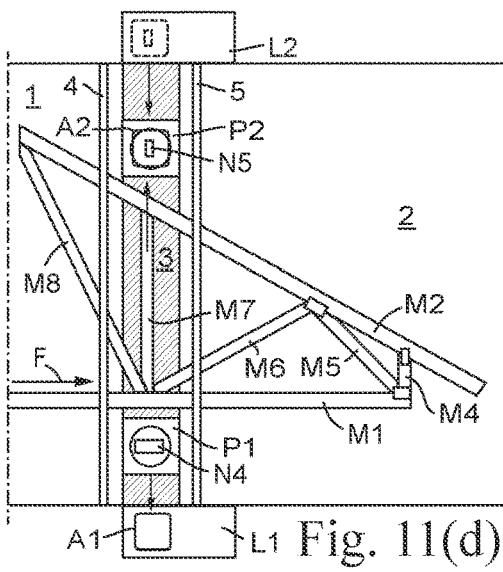

In FIG. 11(d), the structure has moved again forward and the press P1 with its nail plates is ready to move to the joint to perform the pressing. The transfer device A1 has moved back to the loading station L1. On the other hand, the press P2 has moved again aside from the truss structure, and the transfer device A2 has brought the nail plates N5 which are being loaded into the press.

Figure 11E:
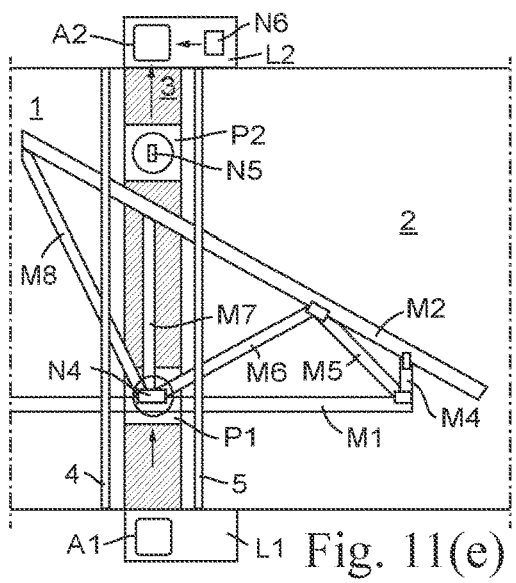

In FIG. 11(e), the press P1 has moved to the joint and performed the pressing of the nail plates N4. The transfer device A1 is still at the loading station L1 and ready for the next task. On the other hand, the nail plates N5 have been loaded into the press P2 and it is ready to perform the next pressing. The transfer device A2 is at the loading station L2 and ready to receive the nail plates N6.

Figure 11F:
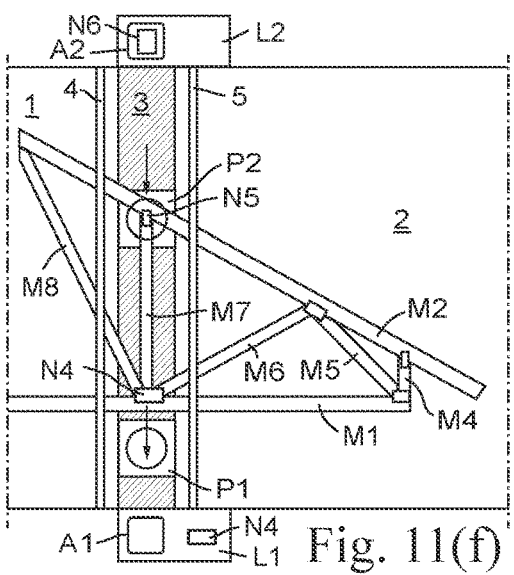

In FIG. 11(f), the press P2 has moved to the joint to perform the pressing of the nail plates N5. The transfer device A2 has the nail plates N6 loaded at the loading station L2. The press P1 has moved aside from the structure to wait for the next task. The transfer device A1 is at the loading station L1 and ready to receive the following nail plates N4.

The presses and loading stations continue to operate in a manner similar to the example described above until the truss is completed and the assembly of the next truss begins.

Figure 12:
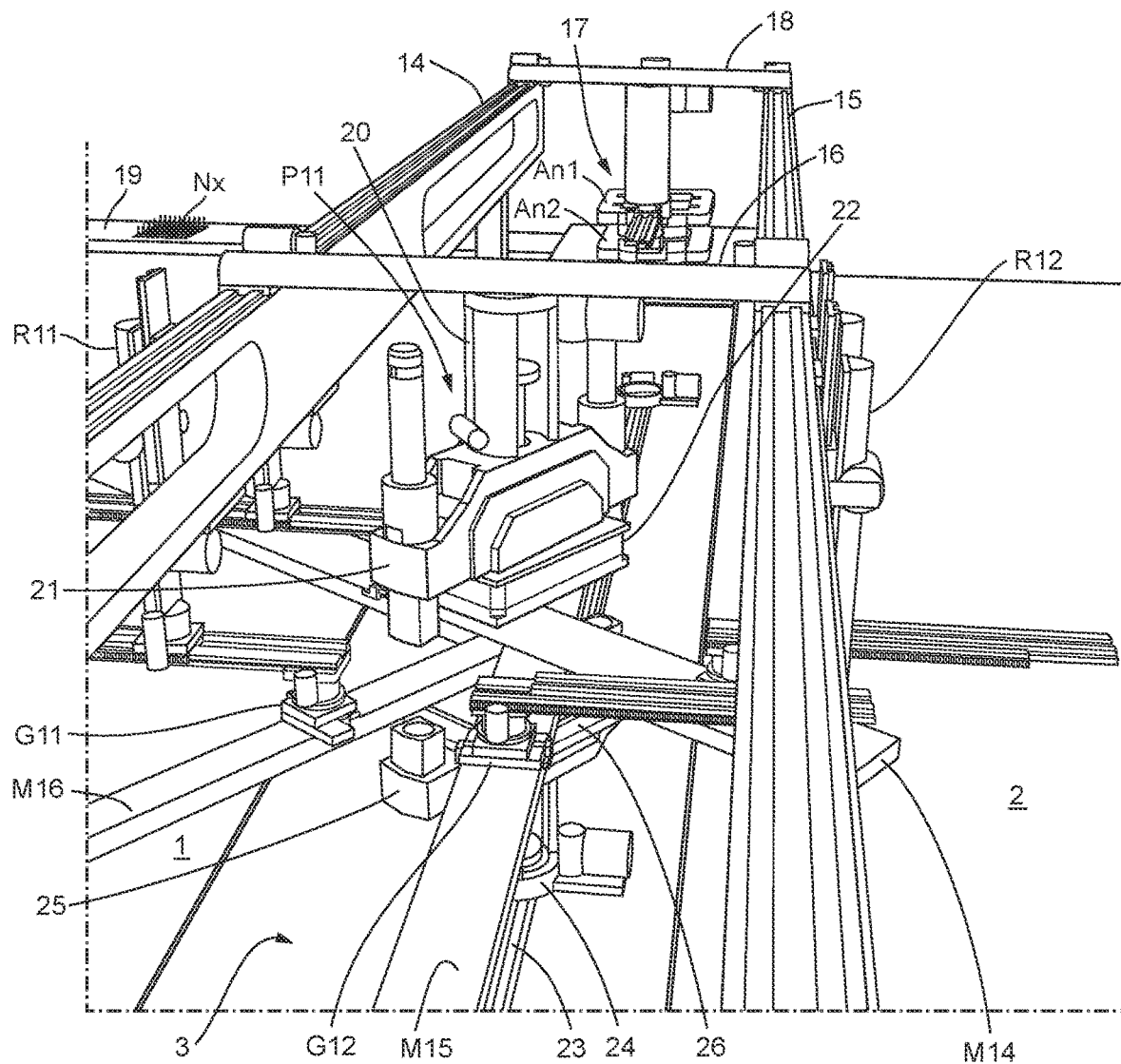
FIG. 12 is a perspective view showing in more detail an example of the assembly station in the system according to the aspects of the disclosed embodiments.

FIG. 12 is a perspective view presenting a possible realisation of the assembly station in the system according to the aspects of the disclosed embodiments. The beams 14 and 15 extending over the assembly line form a portal on which is moving and operating by means of the the bar 16 the upper part of the press P11 comprising the coupling and steering part 20, the body 21 and the press plate 22. In this embodiment, there is no table or like in the press area 3. The robot grippers are realised so that the parts holded by them remain at the level of the tables 1 and 2, and when the nail plates are pressed to the joint, the lower part body 25 and the press plate 26 support the members to be joined, here M14, M15 and M16. The support and steering part 24 of the lower part of the press operates on the rail arrangement 23. When there is no table or like in the press area 3, for example, loading nail plates on both sides of the press can be simplified and made easier.

Only two of the robot grippers are designated herein by reference marks, R11/G11 and R12/G12. Their mounting and movement are arranged on the outside of the beams 14 and 15 so that they can operate independently of the operation of the press P11 and the nail plate transfer device 17. The structure and movement paths of the robot grippers and the press, respectively, are implemented such that when the upper part of the press is in a loading position or is loaded but still waiting for starting pressing, the robot grippers are able to move underneath it to the desired position and the press able to move over the arms and grabbers of the robot grippers.

In this embodiment, the infeed line 19 of the nail plates Nx is at the other side of the assembly line 1, 3, 2. The nail plates required at each time are loaded into the transfer device 17 (the loading station is not shown in detail herein), which moves and operates by means of the bar 18 on the beams 14 and 15. The transfer device is essentially formed by transfer plates A1 and An2, by means of which the nail plates are at each time loaded to the upper and lower part press plates 22 and 26, respectively. The loading is preferably carried out such that the transfer device 17 with its nail plates is moved therefor at the press P11 waiting close to the joint for starting pressing.

Figure 13A:
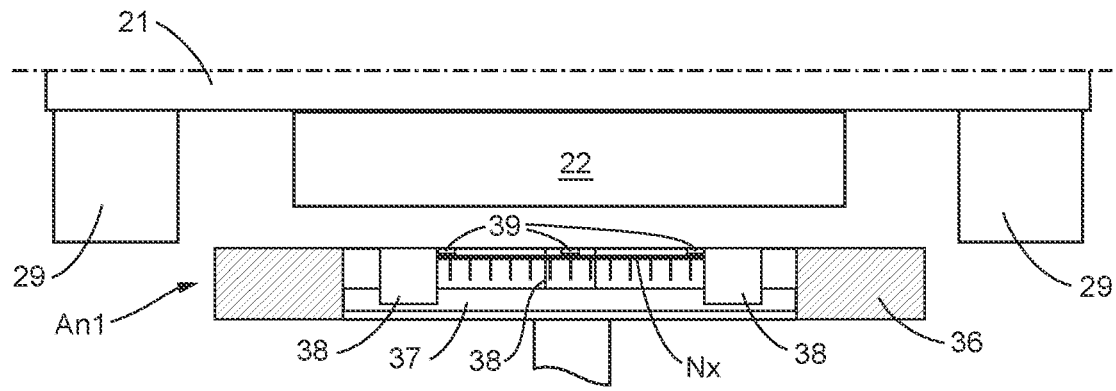
FIGS. 13(a) to 13(c) illustrate schematically a possible way of reliably loading a nail plate into a press plate.
Figure 13B:
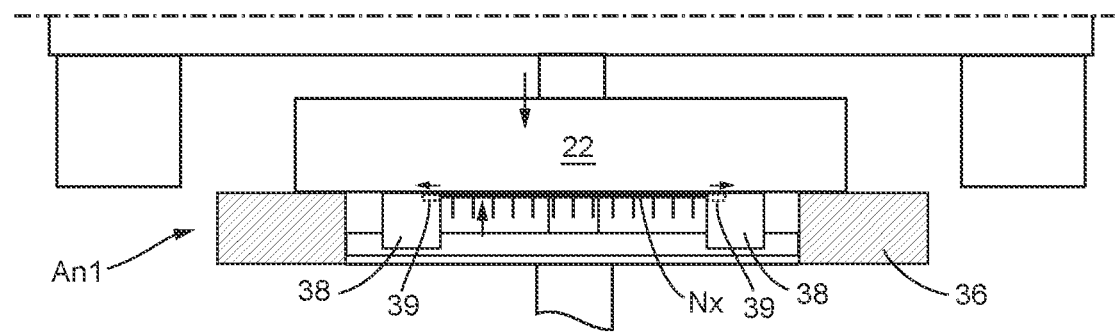
Figure 13C:
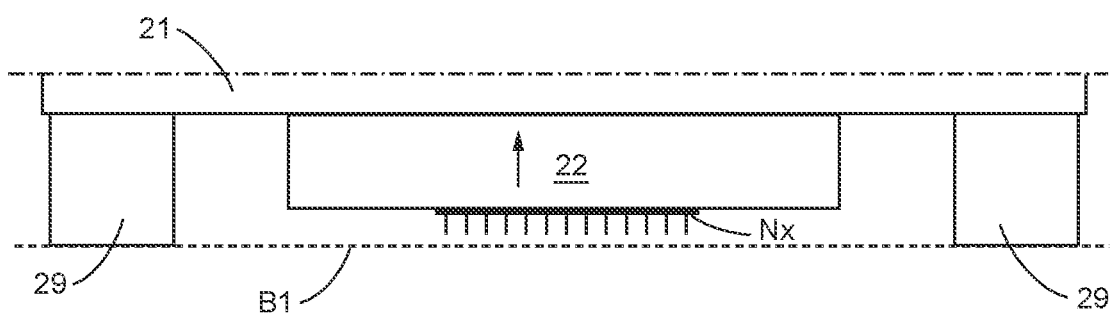

FIGS. 13(a) to 13(c) show in more detail the loading of the nail plate into the upper part press plate, for example in the embodiment of FIG. 12. Downward from the upper part press body 21 extend the projections 29. The press plate 22 is pulled up so that its surface is slightly above the lower surface of the projections 29. The nail plate Nx is positioned on the transfer plate An1 within its frame 36 by means of the side supports 38 and locking claws 39 operating on the rail arrangement 37. The surface of the nail plate is, for example, a few millimeters inward from the surface of the transfer plate frame.

In the situation of FIG. 13(b), the press plate 22 is brought against the transfer plate frame 36 and the locking claws 39 retracted, whereby the electromagnetic force turned on in the press plate draws the nail plate Nx firmly against the surface of the press plate. At this point, the side supports 38 are against the surface of the press plate and precisely guide the nail plate into the right position.

In the situation of FIG. 13(c), the press plate 22 is retracted to its upper position. The dimensions are such that the tips of the nails in the plate Nx remain a few millimeters above the level B1 of the lower surface of the projections of the press body 21.

Loading the nail plate into the press plate of the lower part of the press is performed in substantially the same manner. The press can now move over and under the wooden members and robot grabbers and arms, for example, to the next joint to be pressed complete.

Referring to FIGS. 14(a) to 14(d) and 15(a) to 15(e), an example of the press operating in the assembly station of the system according to the present disclosure is presented schematically in greater detail. The press presented here is similar in structure and function to the press shown in FIG. 12.

Figure 14A:
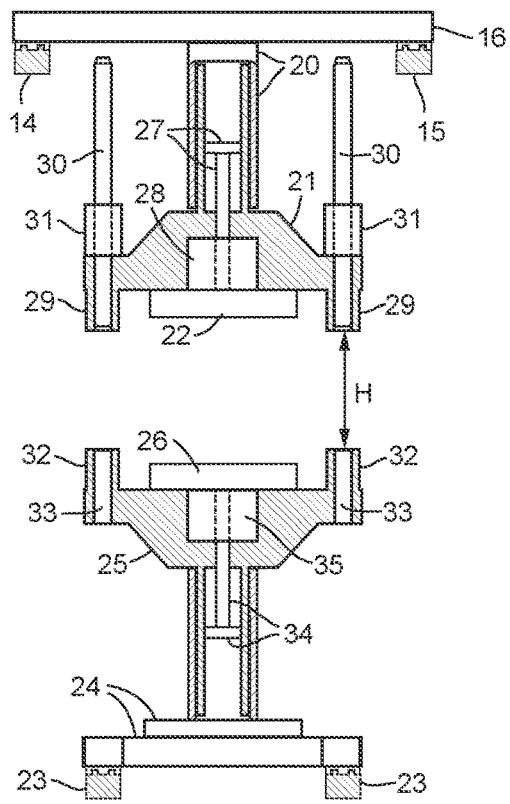
FIGS. 14(a) to 14(d) and 15(a) to 15(e) show schematically and simplified an embodiment of a press unit and its operation.

In FIG. 14(a), the upper body 21 of the press is up. In the holes inside the projections 29 at the ends of the body are provided the rods 30 driven by the motor units 31. The purpose of the rods is to connect the upper and lower bodies 21 and 25 for pressing to form a uniform strong pressing body against which the required high pressing forces may be generated. The body 21 moves vertically and rotates by means of the coupling and steering part 20 on the bar 16. The upper press plate 22 moves vertically and rotates on the body 21 via the shaft and rotating part 27. The pressing force is produced by the pressing motor 28.

The body 25 of the lower part of the press is substantially similar and comprises projections 32 through which via the holes 33 the rods 30 engage to it, for example by means of a thread arrangement. The base structure 24 of the body moves on the rails 23. In the vertical direction, the body of the lower part remains substantially stationary, and the upper body 21 is brought down and engaged to it in a suitable position for pressing. The lower press plate 26 moves vertically and rotates in the press body 25 by means of the shaft and rotating part 34. The pressing force is produced by the pressing motor 35 via the shaft. For example, when moving from one location to another, the press is in the basic position, whereby the distance H between the projection surfaces of the upper and lower portions is kept sufficiently large for movements between it and the other parts, and may for example be 200 mm.

Figure 14B:
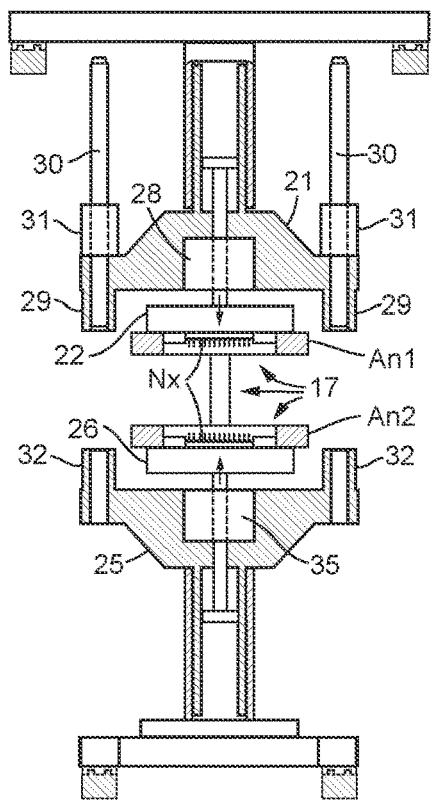

In FIG. 14(b), the nail plates Nx are loaded into the press from the respective transfer plates An1 and An2 brought at the press plates 22 and 26 by the transfer device 17. The upper and lower bodies are held in place and the press plates are brought into positions against the transfer plates. Next, in the way described with reference to FIGS. 13(b) and 13(c), the nail plates are shifted to the press plates which are retracted to the basic positions.

Figure 14C:
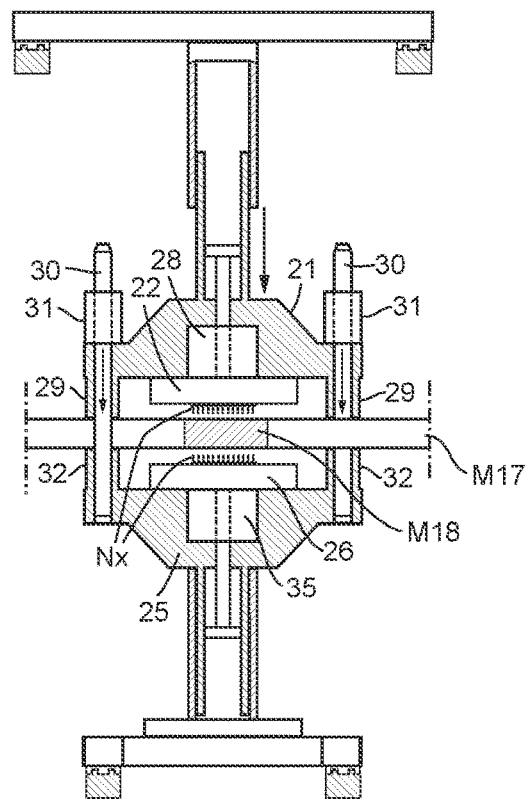

In the situation illustrated in FIG. 14(c), the press has subsequently moved to a joint connecting the members M17 and M18, and the upper and lower bodies 21 and 25 of the press are connected together by means of the rods 30. The press plates 22 and 26 are still in the basic position and the nail plates there in place.

Figure 14D:
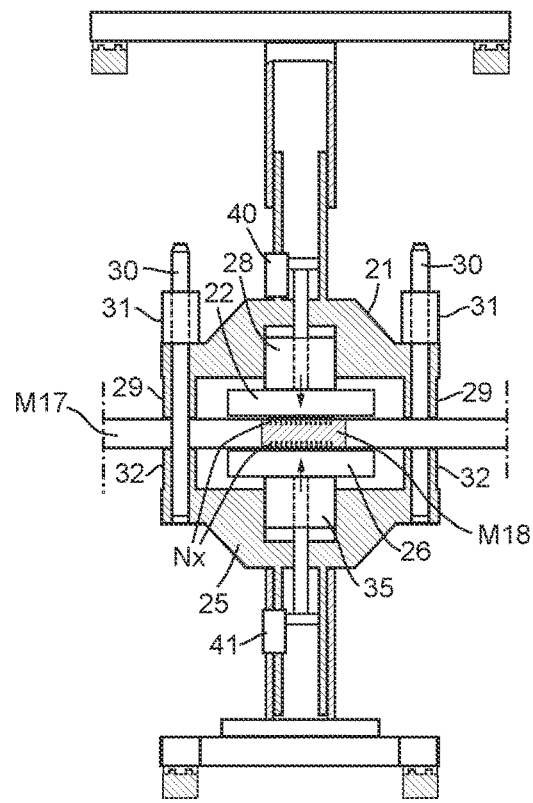

In FIG. 14(d), the press motors 28 and 35 have directed to the press plates forces which have pressed the nail plates Nx into place to complete the joint. Next, the magnetic coupling of the press plates to the nail plates is released, the press plates are drawn to the basic position, the mechanical connection between the upper and lower bodies formed by the rods 30 is relieved, and the situation coming back is the same as in FIG. 14(a).

In certain situations it is also necessary to rotate the press plates relative to the press body. Rotation is effected, for example, by motors mounted with bearings on the press body and moving up and down with the press plate. To illustrate the arrangement, corresponding rotating motors 40 and 41 of the top and bottom press plates 22 and 26 are schematically included in FIG. 14(d).

The pressing motors 28 and 35 may comprise two motors, one of which may be electric for quick fetch of the nail plate and the other hydraulic for pressing. In pressing, the entire bottom surface of the motor is in use, as shown in FIG. 14(d). If the same force may be achieved by the electric spindle, then electric power can be applied and transmitted by means of the shaft.

FIGS. 15(a) to 15(e) show schematically an example of pressing as a top view. Only the upper part of the press is shown here. The lower part performs exactly the same way.

Figure 15A:
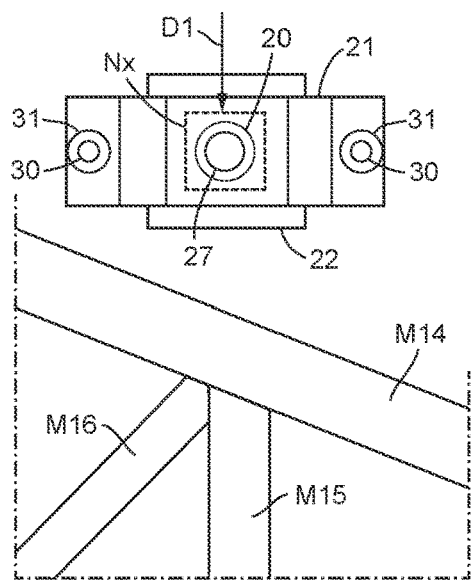
Figure 15B:
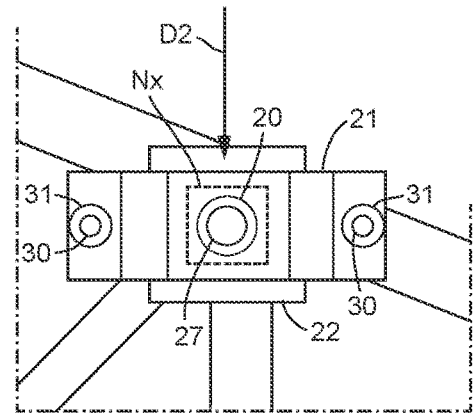
Figure 15C:
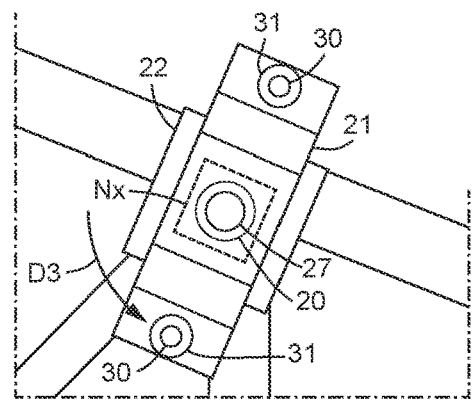
Figure 15D:
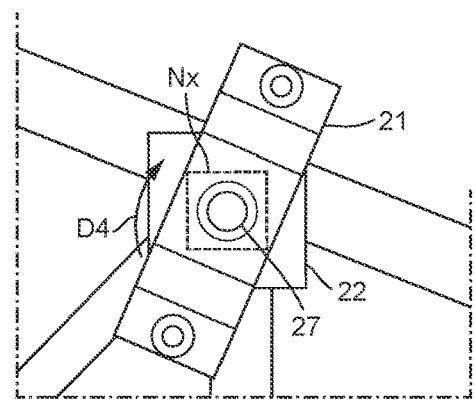
Figure 15E:
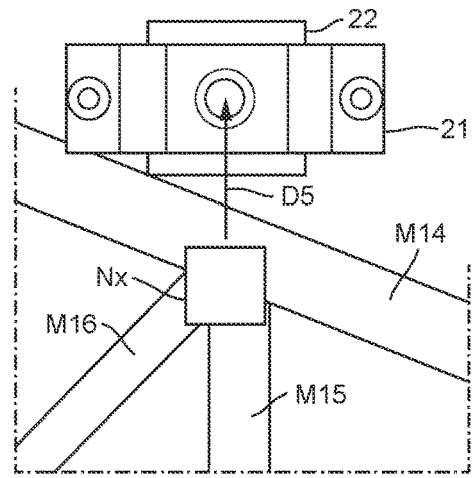

In FIG. 15(a), the press is placed aside from the truss, and the nail plates Nx have been loaded in as shown by the arrow D1. Reference marks indicate various elements in accordance with FIGS. 14(a) to 14(d). The joint that connects the members M14, M15 and M16 is to be accomplished. In FIG. 15(b), the press is moved to the joint as shown by the arrow D2. One of the rods hits the member M14, and therefore the press body 21 must be rotated to a suitable position where the rods 30 can operate between the parts. This has been done in FIG. 15(c) as shown by the arrow D3. Then, in turn, the press plate 22 and with it the nail plate Nx, which are turned along with the body, are in a wrong position, and in FIG. 15(d) the press plate is rotated to the right position as indicated by the arrow D4. In FIG. 15(e) the pressing is done, and the press is moving aside to be loaded there for the next joint as shown by the arrow D5. This joint is now finished by the nail plates Nx connecting the wooden members together on both sides of the structure.

Above described are solutions in which the press comprises upper and lower parts which engage with one another in the pressing operation. In other functions, they are clearly separated from each other so that, for example, the grippers are relatively free to move between them. The construction and operation of the press in the solution of the disclosed embodiments may be of other types, too. For example, when the structure of the roof trusses is generally such that all joints are made to either the top or bottom chord, the system of the disclosed embodiments may also be implemented, for example, with two C-type presses, one operating on the top and another on the bottom chord.

As in the examples described above, in the embodiment of FIGS. 16 to 21 the assembly line comprises the receiving table 1 and the output table 2. The assembly station works in a larger area indicated by the arrow W between the tables 1 and 2. Two assembly units AU1 and AU2 are operating in the area of the assembly station. The unit AU1 comprises the portal arrangement B1, thereon moving presses Px1 and Px2, the required number of robot grippers Gx, and at the ends of the portal arrangement the nail plate loading stations LS1 and LS2 for the presses, respectively. The assembly unit AU2 comprises the portal arrangement B2, respectively, with thereon moving presses Px3 and Px4, the required number of robot grippers Gx, and the nail plate loading stations LS3 and LS4 at the ends of the portal arrangement. The assembly units are arranged to move in the direction x of the assembly line, for example, on the rails R1 and R2 disposed on the sides of the assembly line, so that they can operate as needed over the entire length of the area W.

The solution is described here in a very general and very simplified manner in order to clarify its essential features. In the area W there is a controlled table CB, which is moving the structure forward as indicated by the arrow S2, the table being formed by narrow bars or the like T circulated by a belt or chain arrangement. This table is moving the assembled structure forward as shown by the arrow S1 at same time as new members are added and connected thereto. It is necessary to regulate its movement to a certain extent so that the joints are placed on the table suitably for pressing, and this can be done, for example, by means of robot grippers Gx.

Obviously, this kind of embodiment is more challenging for the control system, automation, robotics and assembly design and programming than, for example, the embodiment described with reference to FIGS. 2 to 8. This kind of more sophisticated system may, however, be profitable when the number of trusses or similar structures to be manufactured at one stretch is large. Similar structures may be, for example, standardised wall element frame structures manufactured in the same way.

FIGS. 16 to 21 include only robot grippers which are active in the situation described and indicate them by the generic reference mark Gx. The total number of robot grippers in the assembly unit may be, for example, such that there are always enough grippers for the joint under operation and also to be positioned ready in the next joint, so that moving the grippers does not slow down the progress of the assembly. In the example illustrated, there may be, for example, about ten grippers in the assembly unit.

Figure 16:
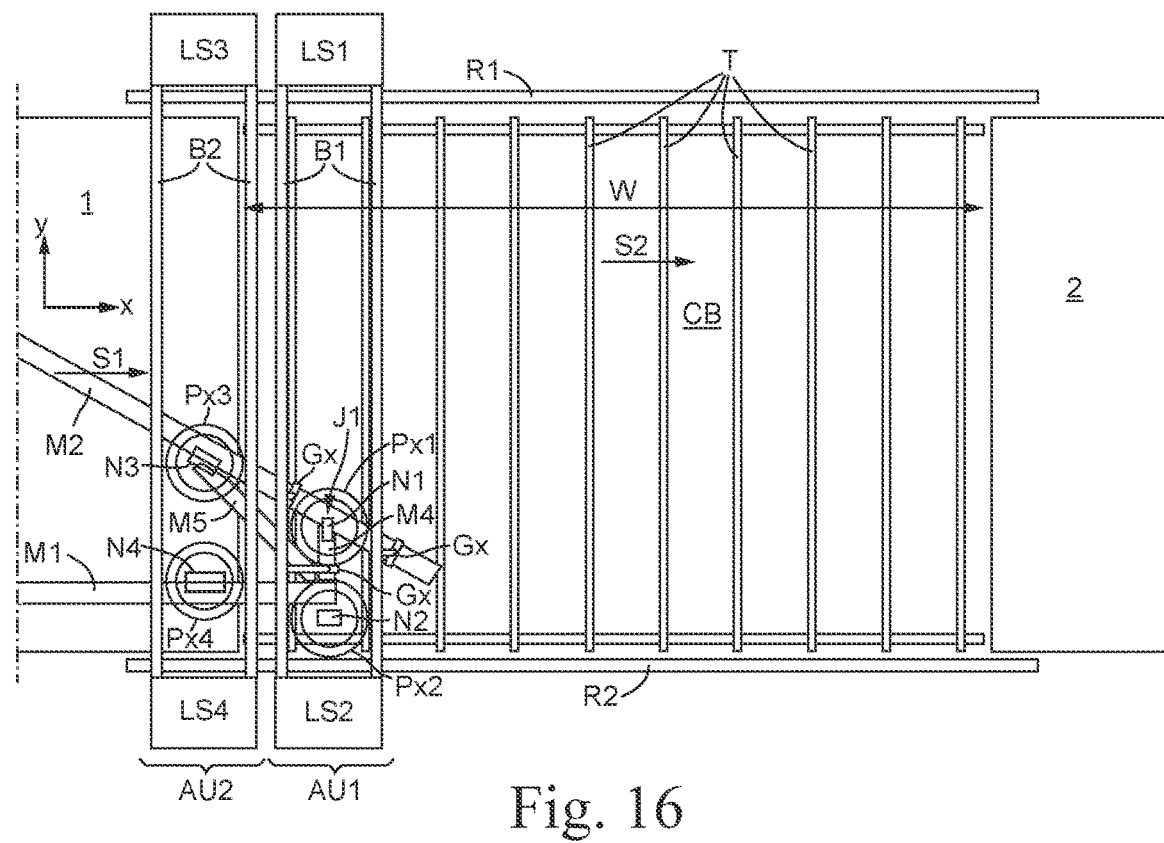
FIGS. 16 to 21 show schematically and simplified one more example of the system according to the aspects of the disclosed embodiments and its operation in the manufacture of the roof truss of FIG. 1.

FIGS. 16 to 21 illustrate the progress of the assembly of the truss of FIG. 1 from joint J1 to joint J6. In FIG. 16, the members M1, M2, M4 and M5 are brought into the table. The grippers Gx hold the member M4 and the member M2 on both sides of the joint. The press Px1 loaded with nail plates N1 is guided in place to press the joint complete. The members and the assembly unit AU1, respectively, are guided to be located on the table CB such that the joint and the press Px1 are suitably aligned between the bars or the like T. The press Px2 is pre-loaded with nail plates N2 and is ready to move into place to press the next joint. The presses Px3 and Px4 of the assembly unit AU2 are pre-loaded with the corresponding nail plates N3 and N4 and are guided to suitable positions for making the joint connections fluently as the assembly proceeds.

Figure 17:
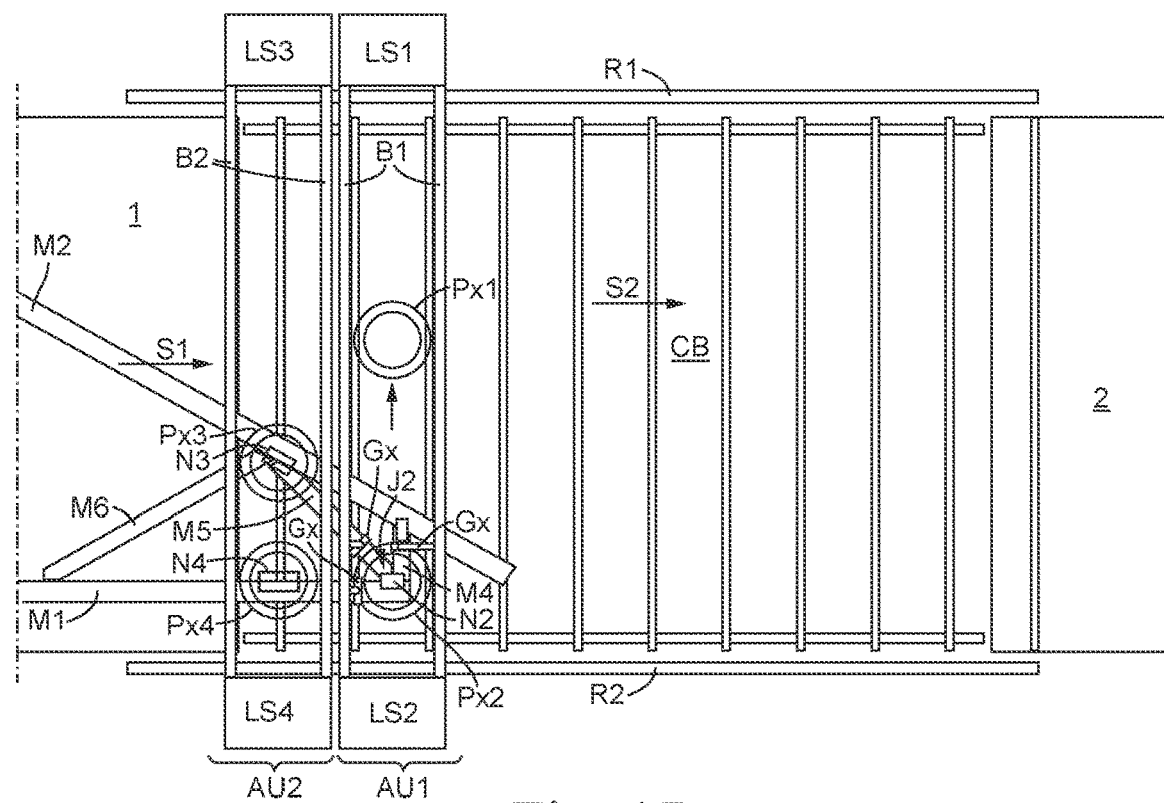

In FIG. 17, the press Px1 is moving toward the loading station LS1 for loading the next nail plates to be pressed thereon. The press Px2 has shifted to press the nail plates N2 into the joint connecting the members M1, M4 and M5 held by the grippers Gx. The member M6 is brought onto the table, and the portal B2 and the press Px3 loaded with the nail plates N3 are guided in position with respect to the truss for the next joint connection. The press Px4 is already at this stage loaded with the nail plates N4.

Figure 18:
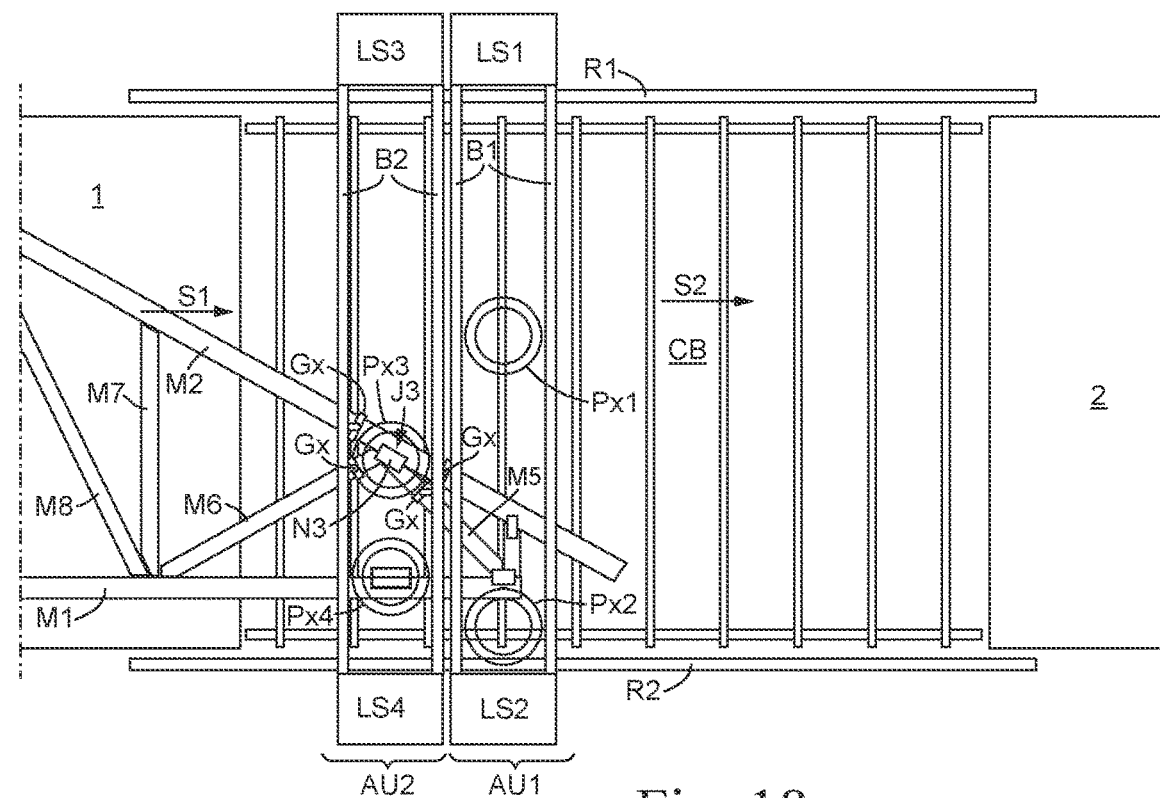

In FIG. 18, the structure is moving forward as shown by the arrow S1, and is aligned on the moving table CB so that the next joint J3 is suitably positioned between the bars or the like T. The portal B2 and the press Px3 have moved following the truss structure, and the grippers Gx hold the member M2 on both sides of the joint and members M5 and M6 close to the joint so that the nail plates N3 may now be pressed in place. The members M7 and M8 are brought onto the table.

Figure 19:
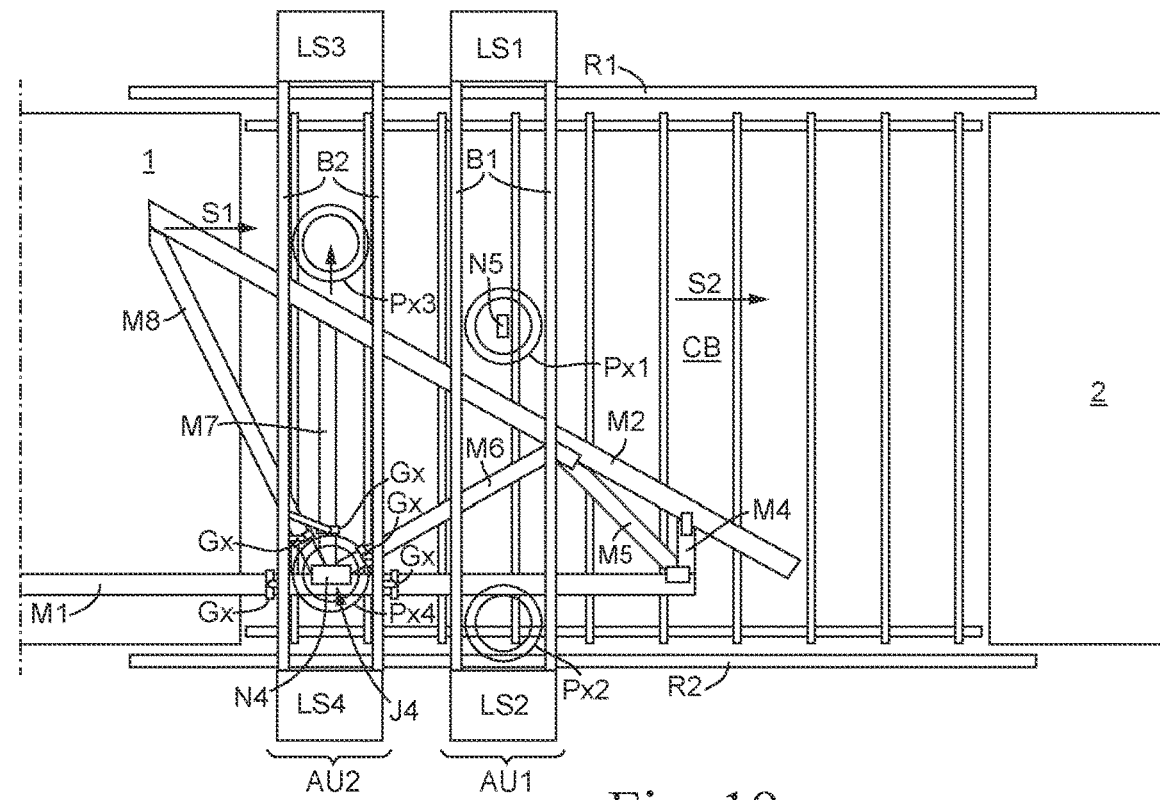

In FIG. 19, the structure has moved forward, and now the portal B2 and the press Px4, where the nail plates N4 were pre-loaded, are guided in the same manner as described above to complete the joint J4. The grippers Gx now hold the member M1 on both sides of the joint and the members M6, M7 and M8 close to the joint. The press Px1 is pre-loaded with the nail plates N5 and is guided to the appropriate position for connecting the next joint.

Figure 20:
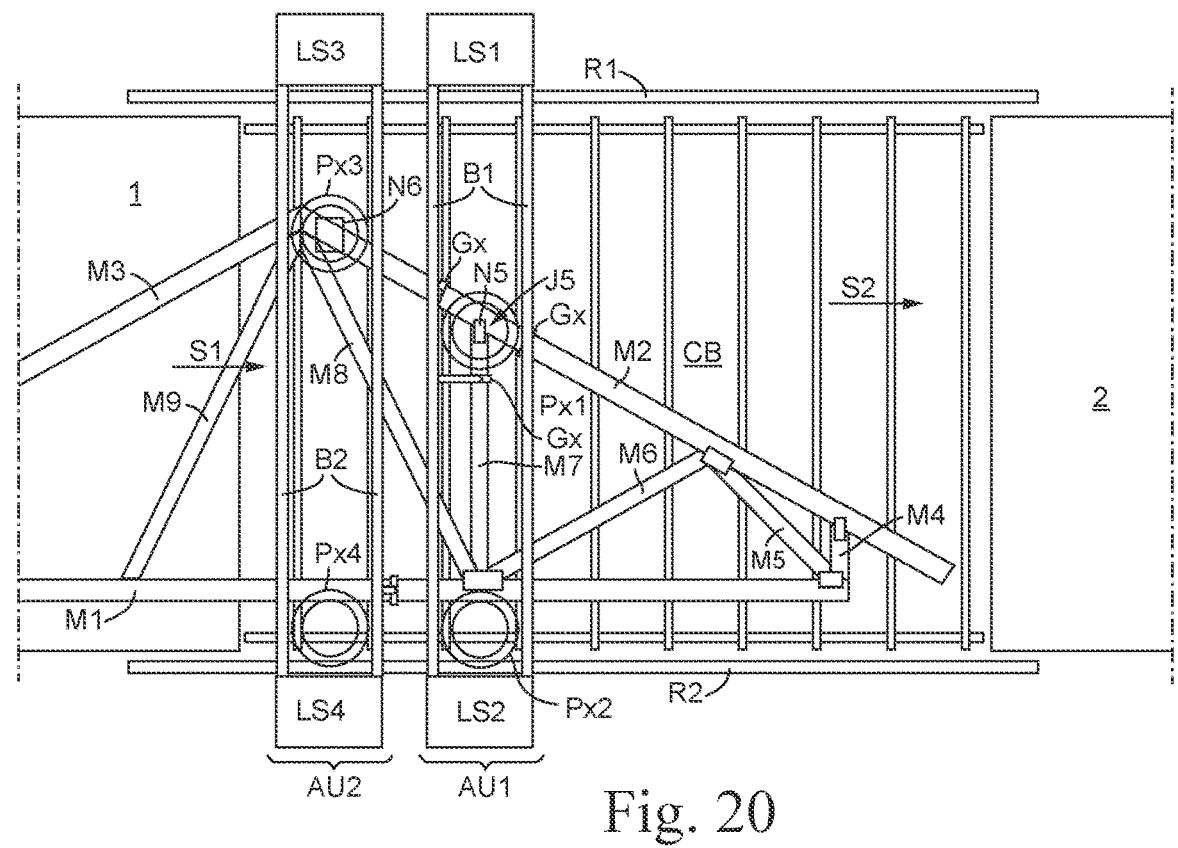

In FIG. 20, there has been a further movement forward. The portal B1 and the press Px1, to which the nail plates N5 had been loaded, are guided to complete the joint J5. The grippers Gx properly hold the members M2 and M7 in place. The members M3 and M9 are brought into the table. The press Px3 is pre-loaded with the nail plates N6 and is guided to the appropriate position for connecting the next joint.

Figure 21:
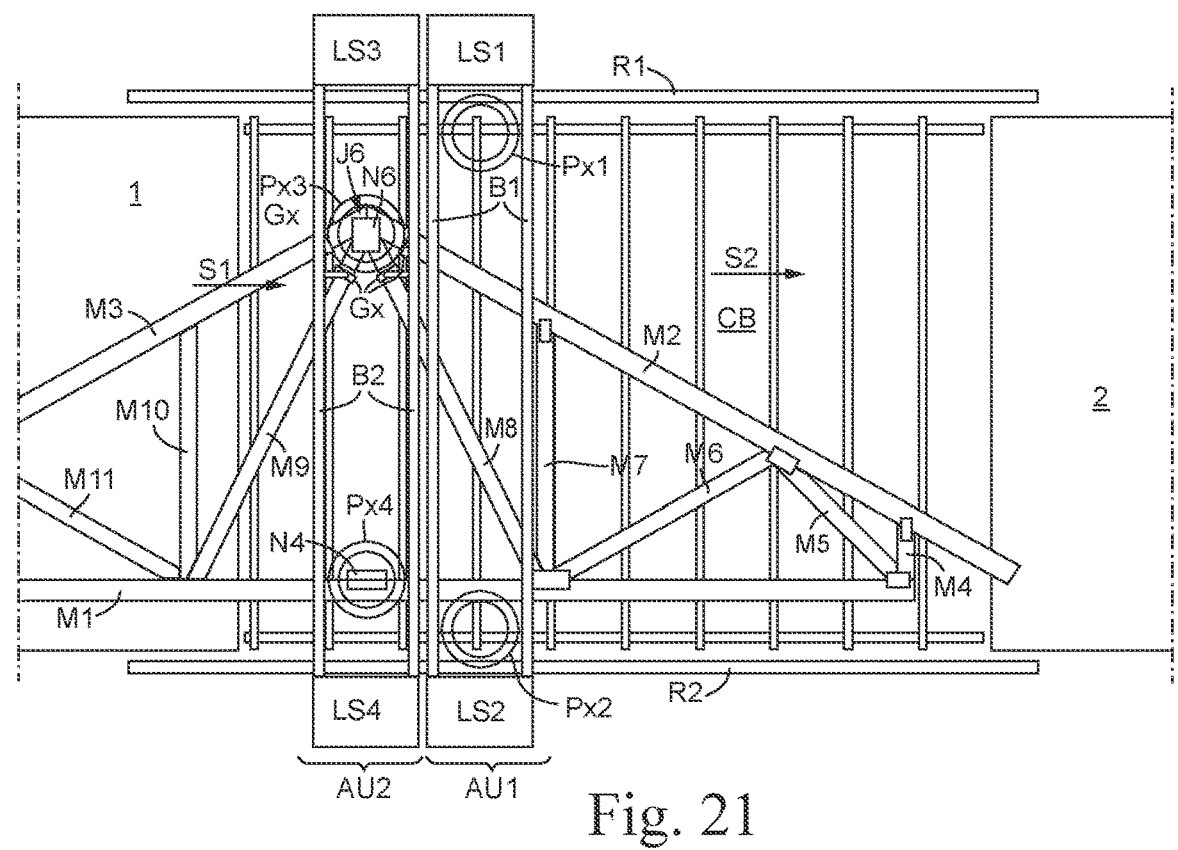

In FIG. 21, there has been a movement to complete the joint J6. The grippers Gx hold the members M2, M3, M8 and M9 in place close to the joint, and the press Px3 is pressing the nail plates N6 in place. The members M10 and M11 are brought into the table. The press Px4 is pre-loaded with the nail plates N4 and the next step is to complete the joint J7.

The assembly is not described further here, but continues as described above until the truss is finished and the next truss assembly may be started.

The foregoing examples presenting the implementations of the aspects of the disclosed embodiments are largely schematical and simplified but describe also in more detail certain essential technical elements and their functional integration in the implementation of the present disclosure. Current advanced technology offers a wide variety of practical possibilities and alternatives for developing different implementations.

In the claims, the aspects of the disclosed embodiments are described by certain terms, like nail plate, receiving table, output table, assembly station and robot gripper, which must be interpreted to mean more broadly also comparable means and arrangements.

The aspects of the disclosed embodiments may vary within the scope of the accompanying claims.

The invention claimed is:

1. A system for manufacturing roof trusses or equivalent structures made from
   wood members dimensioned to fit against each other in joints, and
   nail plates to be pressed into the joints for connecting the wood members there to each other,
   the system comprising:
      a control arrangement for programming and steering a roof truss being assembled in accordance with design data and manufacturing plan on an assembly line, which comprises a receiving table, an assembly station and an output table, and
      transfer and placing arrangements for controlled introduction and placing of the wooden members to the receiving table for the roof truss being assembled,
   wherein the roof truss being assembled is accomplished one joint at a time in a same position of the assembly station, which is laterally fixed relative to the output table, the assembly station comprising:
      one or more presses,
      robot grippers operating around said one or more presses, and
      a nail plate transfer device functionally connected to the one or more presses for feeding said nail plates and loading them to the one or more presses,
   each joint being accomplished as follows:
      the wood members to be joined in addition to the wood members already present there have been moved and positioned on the receiving table and onwards to the assembly station,
      certain robot grippers of the robot grippers grasp and hold the wood members to be joined in accordance with the steering and align them according to the design data in place against each other, and
      certain press of the one or more presses that is loaded with the nail plates designated to this joint is aligned in accordance with the steering in the position of the joint and presses the nail plates in place to complete the joint, and
      after which the roof truss then assembled is guided to move to the output table as needed,
   wherein the assembly station further comprises one or more assembly units, which are arranged to operate and move both transversally and in the direction of progress in a certain area of the assembly line, whereupon the holding of the wood members in place and the pressing of the nail plates may be done continuously while the roof truss being assembled is moving forward.

2. The system according to claim 1, wherein the assembly station further comprises a portal extending over the assembly line, on support of which portal the one or more presses and the robot grippers are operating.

3. The system according to claim 2, wherein the portal is stationary.

4. The system according to claim 1, wherein each press of the one or more presses comprises separate upper and lower parts, the corresponding bodies of which are connectable to each other to form a pressing body against which forces necessary for pressing the nail plates in place may be generated.

5. The system according to claim 4, wherein the each press comprises in the upper and lower parts corresponding pressing plates and means for generating a pressing force against the bodies of the upper and lower parts connected together.

6. A system for manufacturing roof trusses or equivalent structures made from
   wood members dimensioned to fit against each other in joints, and
   nail plates to be pressed into the joints for connecting the wood members there to each other,
   the system comprising:
      a control arrangement for programming and steering a roof truss being assembled in accordance with design data and manufacturing plan on an assembly line, which comprises a receiving table, an assembly station and an output table, and
      transfer and placing arrangements for controlled introduction and placing of the wooden members to the receiving table for the roof truss being assembled,
   wherein the roof truss being assembled is accomplished one joint at a time in a same position of the assembly station, which is laterally fixed relative to the output table, the assembly station comprising:
      one or more presses,
      robot grippers operating around said one or more presses, and
      a nail plate transfer device functionally connected to the one or more presses for feeding said nail plates and loading them to the one or more presses,
   each joint being accomplished as follows:
      the wood members to be joined in addition to the wood members already present there have been moved and positioned on the receiving table and onwards to the assembly station,
      certain robot grippers of the robot grippers grasp and hold the wood members to be joined in accordance with the steering and align them according to the design data in place against each other, and
      certain press of the one or more presses that is loaded with the nail plates designated to this joint is aligned in accordance with the steering in the position of the joint and presses the nail plates in place to complete the joint, and
      after which the roof truss then assembled is guided to move to the output table as needed,
   wherein the assembly station further comprises a portal extending over the assembly line, on support of which portal the one or more presses and the robot grippers are operating.

7. The system according to claim 6, wherein each press of the one or more presses comprises separate upper and lower parts, the corresponding bodies of which are connectable to each other to form a pressing body against which forces necessary for pressing the nail plates in place may be generated.

8. The system according to claim 7, wherein the each press comprises in the upper and lower parts corresponding pressing plates and means for generating a pressing force against the bodies of the upper and lower parts connected together.

9. The system according to claim 6, wherein the portal is stationary.

10. The system according to claim 6, wherein the assembly station further comprises one or more assembly units, which are arranged to operate and move both transversally and in the direction of progress in a certain area of the assembly line, whereupon the holding of the wood members in place and the pressing of the nail plates may be done continuously while the roof truss being assembled is moving forward.

* * * * *